US012579528B2

(12) United States Patent　　　(10) Patent No.:　US 12,579,528 B2
Siefken et al.　　　　　　　　　 (45) Date of Patent:　Mar. 17, 2026

(54) DRIVE THROUGH SYSTEM WITH TRAFFIC MANAGEMENT

(71) Applicant: Xenial, Inc., Charlotte, NC (US)

(72) Inventors: Christopher Siefken, Charlotte, NC (US); Israel Rivera, Philadelphia, PA (US); Keith Shaibley, Lansdale, PA (US); Sean Wegeler, Lansdale, PA (US); Brian Jackson, Seabrook, SC (US); James Davidson, Charlotte, NC (US)

(73) Assignee: Xenial, Inc., Charlotte, NC (US)

( * ) Notice: Subject to any disclaimer, the term of this patent is extended or adjusted under 35 U.S.C. 154(b) by 0 days.

(21) Appl. No.: 19/027,408

(22) Filed: Jan. 17, 2025

(65) Prior Publication Data

US 2025/0182080 A1　　Jun. 5, 2025

Related U.S. Application Data

(62) Division of application No. 18/606,958, filed on Mar. 15, 2024, now Pat. No. 12,327,230.

(Continued)

(51) Int. Cl.
| *G06Q 50/12* | (2012.01) |
| *G06Q 20/20* | (2012.01) |
| *G06V 20/54* | (2022.01) |

(52) U.S. Cl.
CPC ............. *G06Q 20/20* (2013.01); *G06Q 50/12* (2013.01); *G06V 20/54* (2022.01); *G06V 2201/08* (2022.01)

(58) Field of Classification Search
CPC ........ G06Q 20/20; G06Q 50/12; G06V 20/54; G06V 2201/08
See application file for complete search history.

(56) References Cited

U.S. PATENT DOCUMENTS

| 5,235,509 A | 8/1993 | Mueller et al. | |
| 5,974,393 A * | 10/1999 | McCullough .... | G06Q 10/06311 |
| | | | 705/16 |

(Continued)

FOREIGN PATENT DOCUMENTS

| CA | 2204420 C | 9/2005 | |
| EP | 2390775 A2 * | 11/2011 | ........... G06F 3/0488 |

(Continued)

OTHER PUBLICATIONS

U.S. Appl. No. 18/607,011, Xenial, Inc.

(Continued)

*Primary Examiner* — Ashford S Hayles
(74) *Attorney, Agent, or Firm* — Foley & Lardner LLP

(57) ABSTRACT

A method of operating a drive through interface of a drive through system includes detecting a presence of a vehicle at the drive through interface based on image data of a portion of a lane at the drive through interface. The method includes, responsive to an order being placed by a customer in the vehicle via the drive through interface, operating a display screen of the drive through interface to notify the customer that the order is not yet ready for pickup and prompting the customer to keep the vehicle at the drive through interface. The method includes, responsive to the order being ready for pickup at a particular pickup window of multiple pickup windows, operating the display screen of the drive through interface to notify the customer that the order is ready for pickup and prompt the customer to drive the vehicle to the particular pickup window.

18 Claims, 24 Drawing Sheets

Related U.S. Application Data

(60) Provisional application No. 63/606,510, filed on Dec. 5, 2023.

(56) References Cited

U.S. PATENT DOCUMENTS

| | | | |
|---|---|---|---|
| 6,940,393 B2* | 9/2005 | Dev | G06Q 50/12 |
| | | | 235/382 |
| 6,996,460 B1 | 2/2006 | Krahnstoever et al. | |
| 7,082,314 B2 | 7/2006 | Farmer et al. | |
| 8,271,340 B2 | 9/2012 | Awiszus | |
| 8,401,230 B2* | 3/2013 | Kozitsky | G06Q 30/06 |
| | | | 382/104 |
| 8,774,462 B2 | 7/2014 | Kozitsky et al. | |
| 9,324,002 B2 | 4/2016 | Ryan et al. | |
| 9,865,056 B2 | 1/2018 | Bernal et al. | |
| 9,904,903 B1 | 2/2018 | Weiss et al. | |
| 10,082,020 B2 | 9/2018 | Wisniewski et al. | |
| 10,089,983 B1 | 10/2018 | Gella et al. | |
| 10,223,596 B1* | 3/2019 | Edwards | G06Q 30/0633 |
| RE47,380 E | 5/2019 | Bridgman et al. | |
| 10,373,226 B1* | 8/2019 | Russell | G06Q 30/0635 |
| 10,387,945 B2* | 8/2019 | Burry | G06Q 30/0635 |
| 10,453,216 B1* | 10/2019 | Zelenskiy | G06V 20/62 |
| 10,706,846 B1 | 7/2020 | Barton et al. | |
| 10,993,088 B1 | 4/2021 | O'Gwynn et al. | |
| 11,023,955 B1* | 6/2021 | Carpenter, II | G10K 11/17823 |
| 11,030,678 B2 | 6/2021 | Panigrahi et al. | |
| 11,049,198 B1 | 6/2021 | Momin et al. | |
| 11,068,966 B2* | 7/2021 | Burry | G06Q 30/0635 |
| 11,182,864 B1* | 11/2021 | Fox | G06Q 30/0621 |
| 11,244,681 B1 | 2/2022 | Siefken et al. | |
| 11,272,238 B2 | 3/2022 | Friedlander et al. | |
| 11,354,760 B1* | 6/2022 | Dorch | G10L 15/18 |
| 11,443,260 B1* | 9/2022 | van Breen | G08G 1/095 |
| 11,574,345 B2 | 2/2023 | Dorch et al. | |
| 11,594,049 B2 | 2/2023 | Desantola et al. | |
| 11,676,592 B2 | 6/2023 | Sumpter et al. | |
| 11,704,753 B2* | 7/2023 | Dorch | G06V 40/172 |
| | | | 705/15 |
| 11,727,510 B2 | 8/2023 | Rosas-Maxemin et al. | |
| 11,741,529 B2 | 8/2023 | Siefken et al. | |
| 11,755,836 B1 | 9/2023 | Carpenter et al. | |
| 11,798,106 B2 | 10/2023 | Fox | |
| 11,810,550 B2 | 11/2023 | Shukla et al. | |
| 11,862,157 B2 | 1/2024 | Aggarwal et al. | |
| 11,895,675 B2 | 2/2024 | O'Gwynn et al. | |
| 12,105,780 B2 | 10/2024 | Park et al. | |
| 12,182,890 B2 | 12/2024 | Rosas-Maxemin et al. | |
| 12,217,301 B1* | 2/2025 | Villamar | G06Q 50/12 |
| 12,282,876 B2* | 4/2025 | Bjelcevic | G06Q 10/06311 |
| 2001/0002467 A1* | 5/2001 | Ogo | G06Q 20/20 |
| | | | 705/13 |
| 2002/0016747 A1* | 2/2002 | Razumov | G07F 17/10 |
| | | | 705/26.8 |
| 2002/0156682 A1* | 10/2002 | DiPietro | G06Q 20/20 |
| | | | 705/16 |
| 2003/0018531 A1 | 1/2003 | Mahaffy et al. | |
| 2003/0195821 A1 | 10/2003 | Kennamer | |
| 2004/0035643 A1* | 2/2004 | Dev | G06Q 20/20 |
| | | | 705/16 |
| 2004/0035644 A1 | 2/2004 | Ford et al. | |
| 2004/0210474 A1* | 10/2004 | Hart | G06Q 30/02 |
| | | | 705/7.42 |
| 2004/0249497 A1* | 12/2004 | Saigh | E04H 14/00 |
| | | | 700/216 |
| 2004/0260513 A1* | 12/2004 | Fitzpatrick | G06Q 50/12 |
| | | | 702/182 |
| 2005/0200455 A1 | 9/2005 | Veni et al. | |
| 2006/0076397 A1 | 4/2006 | Langos | |
| 2006/0218057 A1 | 9/2006 | Fitzpatrick et al. | |
| 2007/0007331 A1* | 1/2007 | Jasper | G07G 1/14 |
| | | | 235/379 |
| 2007/0022016 A1* | 1/2007 | Steres | G06Q 30/0641 |
| | | | 705/27.1 |

| | | | |
|---|---|---|---|
| 2007/0174142 A1* | 7/2007 | Kissel | G06Q 30/0601 |
| | | | 705/26.1 |
| 2007/0230791 A1 | 10/2007 | Chellapilla et al. | |
| 2008/0107304 A1* | 5/2008 | Coulter | G06V 40/103 |
| | | | 382/103 |
| 2009/0255195 A1* | 10/2009 | Bridgman | E04H 14/00 |
| | | | 52/741.1 |
| 2010/0205640 A1* | 8/2010 | Steinborn | G09F 27/00 |
| | | | 725/74 |
| 2010/0250374 A1* | 9/2010 | Downes | G06Q 50/12 |
| | | | 705/345 |
| 2011/0166967 A1 | 7/2011 | Bernstein | |
| 2011/0258058 A1 | 10/2011 | Carroll et al. | |
| 2012/0106781 A1* | 5/2012 | Kozitsky | G06Q 10/087 |
| | | | 382/103 |
| 2012/0109760 A1* | 5/2012 | Koiso | G06Q 50/12 |
| | | | 705/15 |
| 2013/0106595 A1* | 5/2013 | Loce | G06V 10/60 |
| | | | 340/438 |
| 2013/0216102 A1 | 8/2013 | Ryan et al. | |
| 2013/0282420 A1* | 10/2013 | Paul | G06Q 50/12 |
| | | | 705/7.16 |
| 2014/0267793 A1 | 9/2014 | Wang et al. | |
| 2014/0279080 A1* | 9/2014 | O'Gwynn | G06Q 50/12 |
| | | | 705/15 |
| 2015/0070471 A1* | 3/2015 | Loce | G06Q 20/145 |
| | | | 348/47 |
| 2015/0193755 A1 | 7/2015 | Sibble | |
| 2015/0310459 A1* | 10/2015 | Bernal | G06Q 30/0201 |
| | | | 705/7.29 |
| 2015/0310615 A1* | 10/2015 | Bulan | H04N 23/80 |
| | | | 348/143 |
| 2016/0063459 A1 | 3/2016 | Li et al. | |
| 2016/0155328 A1* | 6/2016 | Bernal | G08G 1/04 |
| | | | 382/104 |
| 2016/0244311 A1* | 8/2016 | Burks | B67D 1/0888 |
| 2016/0342841 A1* | 11/2016 | Bulan | G06V 10/7788 |
| 2017/0018041 A1* | 1/2017 | Fox | G06Q 20/3224 |
| 2017/0323370 A1* | 11/2017 | Burry | G06Q 30/0635 |
| 2017/0323505 A1* | 11/2017 | Gaddam | H04L 63/08 |
| 2018/0012318 A1* | 1/2018 | Li | H04B 10/116 |
| 2018/0025365 A1 | 1/2018 | Wilkinson et al. | |
| 2018/0025445 A1* | 1/2018 | Becker | G07F 9/009 |
| | | | 705/15 |
| 2018/0082234 A1* | 3/2018 | Burt | G06Q 30/0635 |
| 2018/0122022 A1 | 5/2018 | Kelly et al. | |
| 2018/0189781 A1 | 7/2018 | Mccann et al. | |
| 2018/0201227 A1* | 7/2018 | Gao | B60R 25/305 |
| 2019/0012625 A1* | 1/2019 | Lawrenson | G06Q 10/06311 |
| 2019/0108566 A1* | 4/2019 | Coleman | G06Q 30/0633 |
| 2019/0139258 A1* | 5/2019 | Slattery | G06V 20/52 |
| 2019/0171711 A1 | 6/2019 | Carpenter et al. | |
| 2019/0228463 A1* | 7/2019 | Chan | G06Q 30/0641 |
| 2019/0279181 A1 | 9/2019 | Kelly et al. | |
| 2019/0287191 A1 | 9/2019 | Cummings | G01S 17/04 |
| 2020/0005267 A1 | 1/2020 | Siefken et al. | |
| 2020/0034848 A1* | 1/2020 | Seo | G06V 10/82 |
| 2020/0189847 A1* | 6/2020 | Washington | G06Q 30/0603 |
| 2020/0202462 A1 | 6/2020 | Muyskens | |
| 2020/0211130 A1* | 7/2020 | Zanaroli | B65G 1/065 |
| 2020/0226667 A1 | 7/2020 | Kalaimani | |
| 2020/0250771 A1* | 8/2020 | Nagata | G06Q 20/12 |
| 2020/0272176 A1* | 8/2020 | McCann | G06F 40/166 |
| 2020/0311804 A1 | 10/2020 | Buckholdt et al. | |
| 2020/0410421 A1* | 12/2020 | Nelson | G06Q 10/06312 |
| 2021/0295412 A1* | 9/2021 | Phillips | G06Q 30/0631 |
| 2021/0406797 A1* | 12/2021 | Gui | G06Q 30/0633 |
| 2022/0036898 A1* | 2/2022 | Siefken | G06V 20/00 |
| 2022/0165262 A1 | 5/2022 | Sumpter et al. | |
| 2022/0237543 A1* | 7/2022 | Bjelcevic | G06Q 10/06315 |
| 2022/0237713 A1 | 7/2022 | Rosas-Maxemin et al. | |
| 2022/0284488 A1* | 9/2022 | Bamadhaj | G06Q 20/202 |
| 2022/0292618 A1* | 9/2022 | DeSantola | G06T 7/11 |
| 2022/0292834 A1* | 9/2022 | DeSantola | G06N 20/00 |
| 2022/0292853 A1* | 9/2022 | DeSantola | G06V 10/765 |
| 2022/0301082 A1 | 9/2022 | Dorch et al. | |
| 2022/0318860 A1* | 10/2022 | Dorch | G10L 15/28 |
| 2022/0374884 A1 | 11/2022 | Wai et al. | |

(56) References Cited

U.S. PATENT DOCUMENTS

| | | | | |
|---|---|---|---|---|
| 2022/0382504 A1* | 12/2022 | Cioarga | ................. | G06F 3/147 |
| 2023/0061441 A1* | 3/2023 | Morgan | ................. | G06V 20/52 |
| 2023/0169612 A1* | 6/2023 | Liguori | ................. | G06N 20/00 |
| | | | | 705/15 |
| 2023/0200569 A1* | 6/2023 | Todoran | ................. | G06V 20/58 |
| | | | | 186/35 |
| 2023/0206358 A1 | 6/2023 | Fox | | |
| 2023/0298087 A1 | 9/2023 | Nelson et al. | | |
| 2023/0298350 A1* | 9/2023 | Heritier | .................... | G06T 7/70 |
| | | | | 382/103 |
| 2023/0316218 A1* | 10/2023 | Davies | ................. | A47G 29/141 |
| | | | | 705/339 |
| 2023/0316788 A1 | 10/2023 | Desantola et al. | | |
| 2023/0343102 A1* | 10/2023 | Hauke | ................... | G06V 40/10 |
| 2023/0344905 A1 | 10/2023 | Davis et al. | | |
| 2024/0119393 A1* | 4/2024 | Schwenker | ........ | G06Q 30/0635 |
| 2024/0119398 A1* | 4/2024 | Schwenker | ........... | G06Q 50/12 |
| 2024/0119488 A1 | 4/2024 | Schwenker et al. | | |
| 2024/0131718 A1 | 4/2024 | Tulsidas | | |
| 2024/0144401 A1* | 5/2024 | Morgan | ................. | G06Q 50/12 |
| 2024/0379101 A1 | 11/2024 | Bhuwalka et al. | | |

FOREIGN PATENT DOCUMENTS

| | | | | | |
|---|---|---|---|---|---|
| JP | 2012098841 | A | * | 5/2012 | ............. G06Q 50/12 |
| KR | 2666989 | B1 | * | 7/2020 | |
| KR | 102134392 | B1 | * | 7/2020 | ......... G06Q 30/0641 |
| KR | 10-2666989 | B1 | | 5/2024 | |
| WO | WO-9950733 | A2 | * | 10/1999 | ......... G06Q 30/0601 |
| WO | WO-2005041071 | A1 | * | 5/2005 | ........... G06V 10/255 |
| WO | WO-2019028552 | A1 | * | 2/2019 | ............. G06V 20/62 |
| WO | WO-2022192705 | A2 | * | 9/2022 | ............. G16H 40/20 |

OTHER PUBLICATIONS

U.S. Appl. No. 18/607,065, Xenial, Inc.

U.S. Appl. No. 63/452,218, filed Mar. 15, 2023, Xenial, Inc.

U.S. Appl. No. 63/529,850, filed Jul. 31, 2023, Xenial, Inc.

U.S. Appl. No. 63/539,920, filed Sep. 22, 2023, Xenial, Inc.

U.S. Appl. No. 63/587,611, filed Oct. 3, 2023, Xenial, Inc.

Emery, B. G., Hodges, B., & Tiger, A. (2017). Simulating the impact of mobile ordering at chick-fil-A. Journal of Marketing Development and Competitiveness, 11(1), 51-58. Retrieved from https://www.proquest.com/scholarly-journals/simulating-impact-mobile-ordering-at-chick-fil/docview/1930104172/se-2 (Year: 2017).

International Search Report and Written Opinion of the International Searching Authority issued in Application No. PCT/US2024/020236, mailed May 10, 2024.

International Search Report and Written Opinion of the International Searching Authority issued in Application No. PCT/US2024/020256, mailed Jun. 14, 2024.

International Search Report and Written Opinion of the International Searching Authority issued in Application No. PCT/US2024/020310, mailed May 2, 2024.

Non-Final Office Action on U.S. Appl. No. 18/606,958 mailed Aug. 20, 2024.

Notice of Allowance on U.S. Appl. No. 18/606,958 mailed Jan. 7, 2025.

Severson, K., The Baltimore Sun (Nov. 10, 2023). A faster, smoother way to grab a bite fast-food industry embraces shift after pandemic, rolls out drive-thru upgrades. Retrieved from https://www.proquest.com/newspapers/faster-smoother-way-grab-bite-fast-food-industry/docview/2887932639/se-2.

U.S. Appl. No. 19/225,727, filed Jun. 2, 2025, Xenial, Inc.

* cited by examiner

<u>1300</u>

1302
Obtain image data of a drive through

1304
Detect vehicles in the drive through

1306
Determine which of multiple order locations an incoming vehicle should be routed to 1308
Operate a display screen to route the incoming vehicle to an identified order location 1310
Obtain point of sale data as the result of taking an order for the incoming vehicle 1312
Operate a display screen at the order location to prompt the incoming vehicle to stay at the order location until ready 1314
Determine, based on the point of sale data, kitchen data, and the image data, which of multiple windows to route the incoming vehicle to 1316
Responsive to the order for the incoming vehicle being ready, operate the display screen at the order location to route the incoming vehicle to the determined window

DRIVE THROUGH SYSTEM WITH TRAFFIC MANAGEMENT

CROSS-REFERENCE TO RELATED PATENT APPLICATION

This application claims the benefit of and priority to U.S. Provisional Application No. 63/606,510, filed Dec. 5, 2023, the entire disclosure of which is incorporated by reference herein.

FIELD

The present disclosure relates to traffic management. More specifically, the present disclosure relates to traffic management for drive throughs.

BACKGROUND

Drive through systems may have multiple lanes with a combination of display interfaces, microphones, speakers, and vehicle detection capabilities. When a customer arrives at the drive through system, the customer may communicate via a menu board or unit with an order taker to place their order. The customer then pulls around to pay and pick up their order. Cameras may obtain image data of vehicles at the drive through system.

SUMMARY

One implementation of the present disclosure is a drive through system, according to some embodiments. The drive through system includes a point of sale interface, a drive through interface, multiple cameras, and processing circuitry, according to some embodiments. In some embodiments, the point of sale interface us configured to be operated to implement a point of sale transaction. In some embodiments, the drive through interface includes a display screen configured to present display data to a customer in a vehicle. The cameras are configured to obtain image data of a lane of the drive through system, according to some embodiments. The processing circuitry is configured to detect a presence of the vehicle at the drive through interface based on the image data obtained from the cameras, according to some embodiments. The processing circuitry is also configured to implement the point of sale transaction for an order associated with the customer in the vehicle, according to some embodiments. The processing circuitry is configured to operate the display screen of the drive through interface to communicate with the customer, and responsive to the order for the customer being available for retrieval, identify one of multiple pickup windows at the drive through system and cause the display screen of the drive through interface to direct the customer to drive to the one of the pickup windows for retrieval of the order, according to some embodiments.

In some embodiments, the drive through system further includes a kitchen system comprising a controller, multiple stations, and multiple screens. In some embodiments, the kitchen system is configured to notify the processing circuitry that the order for the customer is ready for retrieval based on an identified status of the order having completed a final stage in preparation at a last one of the stations.

In some embodiments, identifying the one of the pickup windows is performed based on at least one identified characteristic of the vehicle. In some embodiments, the at least one identified characteristic determined by the processing circuitry is based on the image data obtained from the cameras. In some embodiments, the at least one identified characteristic includes a size of the vehicle or a type of the vehicle. In some embodiments, the processing circuitry is configured to identify the one of the pickup windows based on both (i) the at least one identified characteristic of the vehicle, and (ii) a default pickup window of the pickup windows.

In some embodiments, the processing circuitry is configured to implement multiple point of sale transactions for different customers in the vehicle to generate order data for multiple orders. In some embodiments, the processing circuitry is configured to tag the order data to the vehicle, and responsive to all of the orders being available for retrieval at one of the pickup windows at the drive through system, cause the display screen of the drive through to direct a driver of the vehicle to drive to the one of the pickup windows for retrieval of the orders. In some embodiments, identifying the one of the pickup windows is performed based on a length or complexity of the order for the customer in the vehicle.

In some embodiments, causing the display screen of the drive through interface to direct the customer to drive to the one of the pickup windows includes operating the display screen to provide a textual or visual indication instructing the customer in the vehicle to proceed to the one of the pickup windows, and an indication of which of the pickup windows serves as a next destination for the vehicle. In some embodiments, the indication includes at least one of a number, a letter, a color, or a geometric shape.

In some embodiments, the display screen is one of multiple display screens of multiple drive through interfaces. In some embodiments, the processing circuitry is configured to cause the display screens of the drive through interfaces to direct different vehicles to the pickup windows for retrieval of corresponding orders in a coordinated manner. In some embodiments, the processing circuitry operates the display screens to direct the different vehicles to the pickup windows at different times.

In some embodiments, the lane is one of multiple lanes of the drive through system. In some embodiments, the drive through system further includes a field display screen positioned proximate an entrance to the lanes of the drive through system. In some embodiments, the cameras include at least one camera configured to obtain image data of the lanes of the drive through system and the entrance to the lanes. In some embodiments, the processing circuitry is configured to determine, based on the image data of the lanes and the entrance to the lanes, a stack size of each of the lanes. In some embodiments, the stack size is a total number of vehicles currently in each of the lanes. In some embodiments, the processing circuitry is configured to select one of the lanes based on the stack size of each of the lanes. In some embodiments, the processing circuitry is configured to operate the field display screen to notify an incoming vehicle to drive to the selected one of the lanes.

Another implementation of the present disclosure is a system for a drive through, according to some embodiments. In some embodiments, the system includes processing circuitry configured to detect, based on data obtained from multiple imaging devices, a presence of a vehicle at a drive through unit. In some embodiments, the processing circuitry is configured to obtain order data for an order of the vehicle at the drive through unit. In some embodiments, the processing circuitry is configured to, responsive to a determination that the order of the vehicle is unprepared or is currently in a process of being prepared, operate a display screen of the drive through unit to display a first prompt instructing the vehicle to stay at the drive through unit. In some embodiments, the processing circuitry is configured to, responsive to the order of the vehicle being fully prepared and available at a window for retrieval, operate the display screen of the drive through unit to display a second prompt instructing the vehicle to proceed to the window, the prompt further including an indication of an identifier of the window.

In some embodiments, the window is one of multiple windows of a restaurant. In some embodiments, the indication of the identifier of the window includes a unique textual identifier or a unique graphical identifier. In some embodiments, the windows include different textual identifiers or graphical identifiers viewable by a user in a vehicle traveling in a pickup lane along which the windows are located.

In some embodiments, the window is one of multiple windows. In some embodiments, the processing circuitry is configured to determine, based on an identified characteristic of the vehicle and a detected presence of other vehicles at the windows, a particular one of the windows at which the order should be retrieved at by the vehicle. In some embodiments, the processing circuitry is configured to operate a staff screen to notify order fulfillment staff regarding the particular one of the windows the order should be retrieved at. In some embodiments, operating the display screen of the drive through unit to display the second prompt includes operating the display screen of the drive through unit to notify a customer in the vehicle regarding the particular one of the windows the order should be retrieved at, and prompting the customer in the vehicle to drive to the particular one of the windows. In some embodiments, the identified characteristic of the vehicle includes a size of the vehicle. In some embodiments, the processing circuitry is configured to determine the particular one of the windows at which the order should be received based on (i) the size of the vehicle, (ii) an identification of which of the windows are available, and (iii) a preferred one of the windows based on the size of the vehicle.

In some embodiments, the processing circuitry is configured to, in response to receiving an input from a customer in the vehicle, operate the display screen of the drive through unit to instruct the customer to drive the vehicle to a particular parking spot for a remedial order procedure. In some embodiments, operating the display screen further includes providing a visual identification to the customer regarding which of multiple parking spots to park in.

In some embodiments, the identified characteristic of the vehicle includes a type of payment method of the customer in the vehicle. In some embodiments, the processing circuitry is configured to determine the particular one of the windows at which the order should be received based on the type of payment method of the customer in the vehicle, and based on which of the windows include equipment configured to process the type of payment method of the customer.

In some embodiments, the window is one of multiple windows. In some embodiments, the processing circuitry is configured to determine, based on a detected presence of other vehicles at the windows and a default window of the windows, a particular one of the windows at which the order should be retrieved at by the vehicle. In some embodiments, the particular one of the windows is the default window if no vehicle is present at the default window. In some embodiments, the processing circuitry is configured to operate a staff screen to notify order fulfillment staff regarding the particular one of the windows the order should be retrieved at. In some embodiments, operating the display screen of the drive through unit to display the second prompt includes operating the display screen of the drive through unit to notify a customer in the vehicle regarding the particular one of the windows the order should be retrieved at, and prompting the customer in the vehicle to drive to the particular one of the windows.

In some embodiments, the drive through unit is positioned in one of multiple lanes. In some embodiments, each of the lanes include a corresponding drive through unit. In some embodiments, the processing circuitry is configured to determine, based on image data of the lanes and an entrance to the lanes, a stack size of each of the lanes, the stack size being a total number of vehicles currently in each of the lanes. In some embodiments, the processing circuitry is configured to select one of the lanes based on the stack size of each of the lanes. In some embodiments, the processing circuitry is configured to operate a field display screen to notify an incoming vehicle to drive to the selected one of the lanes, the field display screen positioned at the entrance to the lanes.

Another implementation of the present disclosure is a method of operating a drive through interface of a drive through system, according to some embodiments. In some embodiments, the method includes detecting a presence of a vehicle at the drive through interface based on image data of a portion of a lane at the drive through interface. In some embodiments, the method includes, responsive to an order being placed by a customer in the vehicle via the drive through interface, operating a display screen of the drive through interface to notify the customer that the order is not yet ready for pickup and prompt the customer to keep the vehicle at the drive through interface. In some embodiments, the method includes, responsive to the order being ready for pickup at a particular pickup window of multiple pickup windows, operating the display screen of the drive through interface to notify the customer that the order is ready for pickup and prompt the customer to drive the vehicle to the particular pickup window.

In some embodiments, the method includes determining, based on image data indicating a presence of vehicles at the pickup windows, and a characteristic of the vehicle, a particular one of the windows at which the order is to be retrieved. In some embodiments, the method includes, responsive to the order being prepared, operating a staff screen to notify order fulfillment staff regarding the particular one of the pickup windows the order should be retrieved at.

In some embodiments, the characteristic of the vehicle includes a size of the vehicle. In some embodiments, the method includes determining the particular one of the pickup windows based on a preferred pickup window for vehicles of the size of the vehicle.

In some embodiments, the characteristic of the vehicle includes a payment method of the customer in the vehicle. In some embodiments, the method includes determining the particular one of the pickup windows based on the payment method and which of the pickup windows include equipment configured to process the payment method of the customer. In some embodiments, the method further includes operating the display screen of the drive through interface to notify the customer that the order is not yet ready for pickup and prompt the customer to keep the vehicle at the drive through interface until both (1) the customer has paid at the drive through interface, and (2) the order is ready for pickup at the particular pickup window of the pickup windows.

This summary is illustrative only and is not intended to be limiting. Various aspects, inventive features, and advantages of the systems described herein are set forth in more detail below.

BRIEF DESCRIPTION OF THE DRAWINGS

The disclosure will become more fully understood from the following detailed description, taken in conjunction with the accompanying FIGURES, wherein like reference numerals refer to like elements, in which:

FIG. 12 is a flow diagram of a process of directing traffic flow in a drive through, according to some embodiments.

FIG. 23 is an order taker interface for the drive through system of FIG. 1, according to some embodiments.

DETAILED DESCRIPTION

Before turning to the FIGURES, which illustrate the exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Overview

Referring generally to the FIGURES, a vision system for a drive through system can include cameras that track vehicles through their life cycle of the drive through system. The vision system may implement a machine learning technique in order to automatically identify a type and color of the vehicles in the drive through system. The vision system is integrated with a transaction system, e.g., a system of point of sale units, such that the point of sale units are updated to indicate the type and color of the vehicles. Integrating the vision system with the point of sale units facilitates improved speed and order fulfillment accuracy of the drive through system.

Drive Through System

Figure 1:
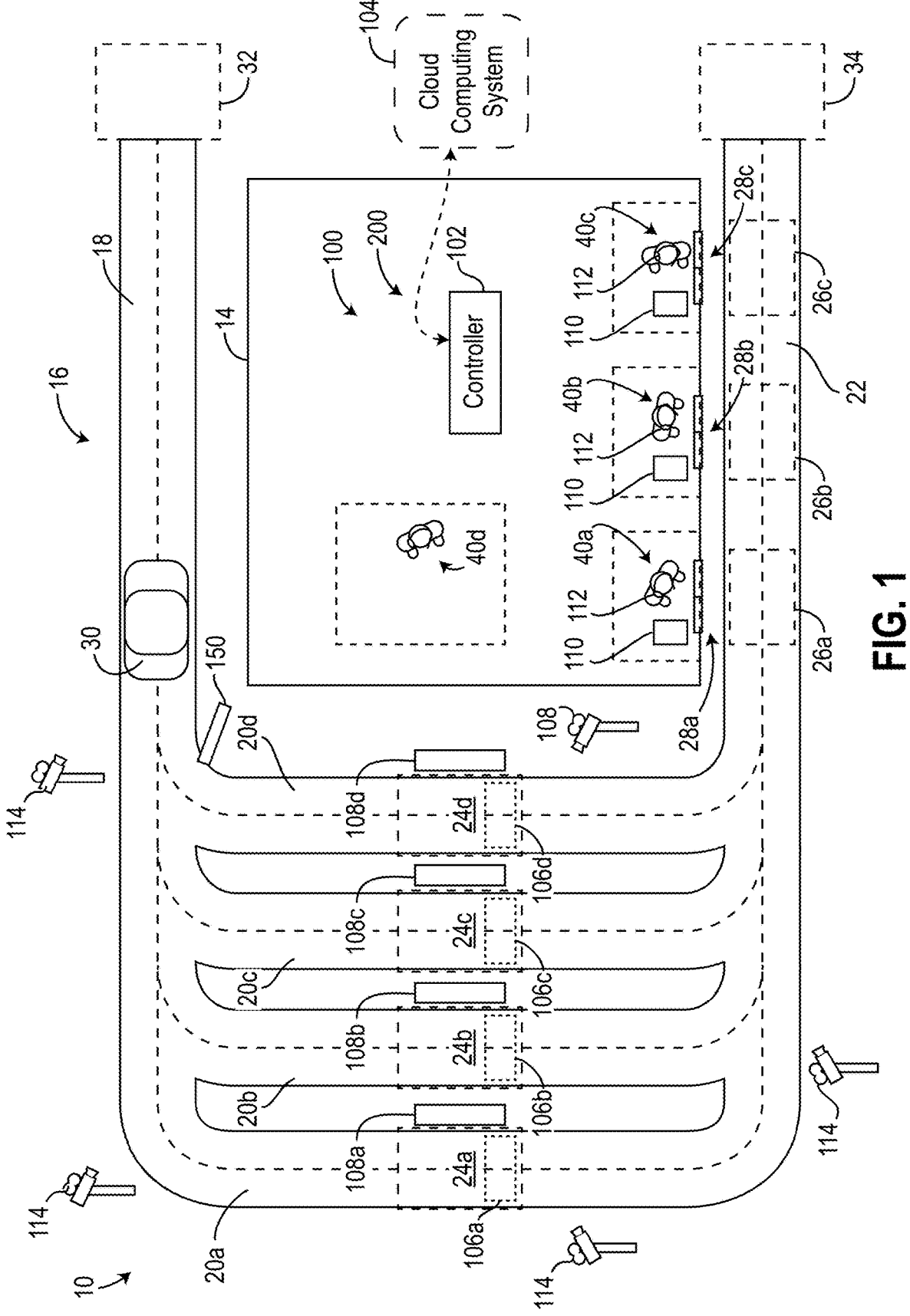
FIG. 1 is a diagram of a drive through system including four lanes and a communications system for communicating with customers of the four lanes, according to some embodiments.
Figure 2:
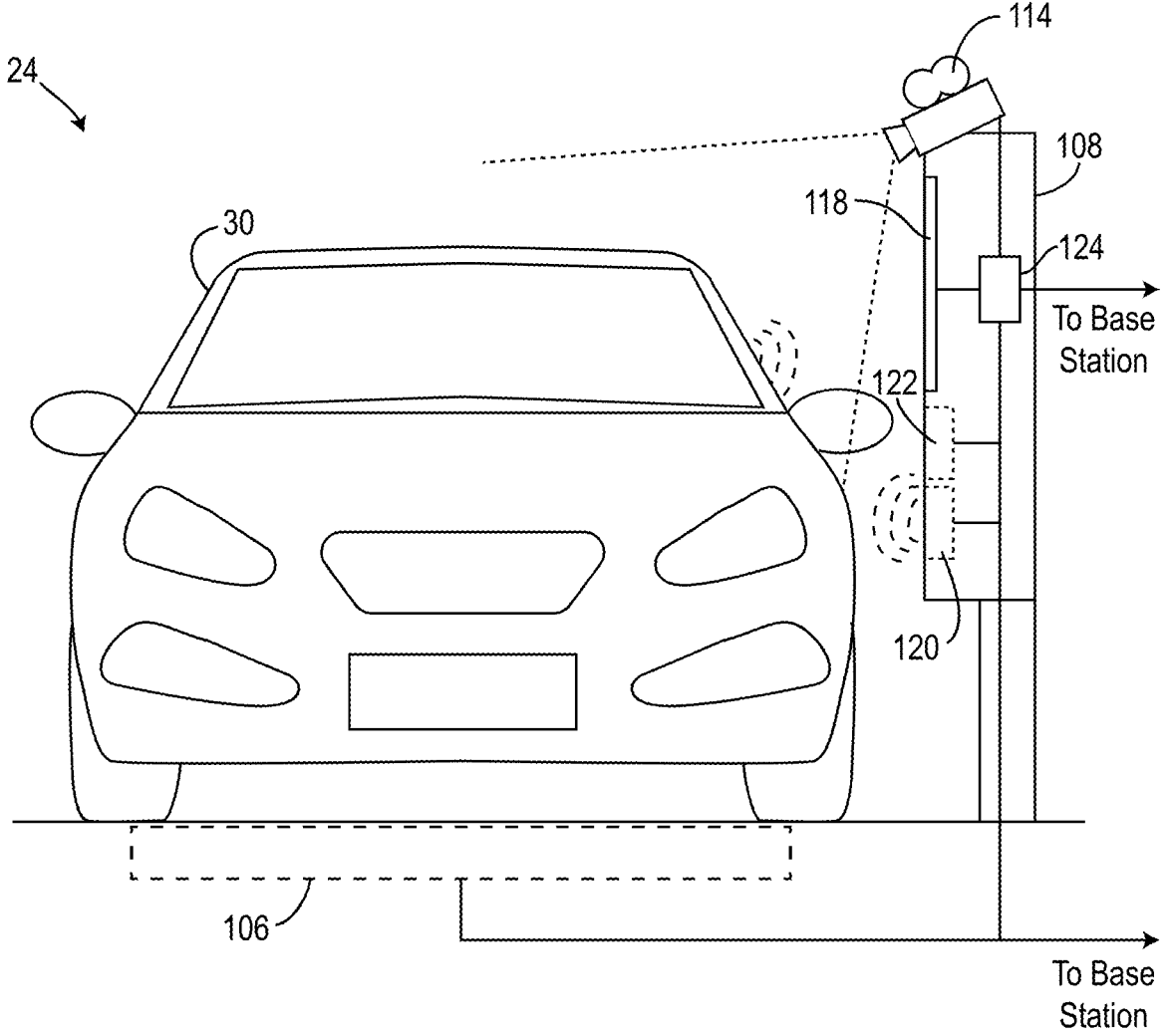
FIG. 2 is a diagram of an order station of the drive through system of FIG. 1 at which a customer may place an order by speaking or causing an input such as an audible input to be provided into a microphone of a drive through unit that is in communications with an order taker of a restaurant, according to some embodiments.

Referring particularly to FIGS. 1-2, a drive through system 10 for a store 14 (e.g., a restaurant, a diner, a fast food restaurant, an establishment, etc.) includes a lane system 16 (e.g., a starting lane, one or more ordering lanes where a transaction such as a point of sale (POS) transaction can be conducted or initiated, ordering lanes where customers may communicate with employees of the store 14, etc.), a starting location 32, and an ending location 34. The starting location 32 can be a zone or area at which one or more customers (e.g., customers in vehicles, shown as vehicle 30) enter the lane system 16. The lane system 16 includes an entry lane 18, a first order lane 20a, a second order lane 20b, a third order lane 20c, a fourth order lane 20d, and a pickup lane 22. The pickup lane 22 (e.g., an exit lane) may extend along a side of the store 14 including one or more pickup windows, shown as first window 28a, second window 28b, and third window 28c such that customers (e.g., vehicles 30) may access the different windows 28 to pick up their orders from the store 14. The term "window" should be interpreted broadly to mean a customer-store interface which is not limited to those with a physical screen or barrier.

The starting location 32 and the ending location 34 may define starting and ending points for customers, with the order lanes 20 defining different paths between the starting location 32 and the ending location 34. In some embodiments, each of the order lanes 20 defines a corresponding order zone 24 at which the customer may place an order for pickup at one of the windows 28. In some embodiments, the first lane 20a includes a first order zone 24a, the second lane 20b includes a second order zone 24b, the third lane 20c includes a third order zone 24c, and the fourth lane 20d includes a fourth order zone 24d. Each of the order zones 24 includes a corresponding drive through unit 108 (e.g., a menu board, a kiosk, a field communications unit, an order placement unit at which a customer may place an order, a drive through interface, etc.) which facilitates communications between the customer at the order zones 24 and personnel of the store 14, as well a display screen or signage indicating available items for purchase, and order or POS information (e.g., a number of items, corresponding cost, total cost, tax, etc., for an ongoing order). In some embodiments, the first order lane 20a includes a first drive through unit 108a, the second order lane 20b includes a second drive through unit 108b, the third order lane 20c includes a third drive through unit 108c, and the fourth order lane 20d includes a fourth drive through unit 108d. In some embodiments, the order lanes 20 define one or more paths that include a series of discrete geometric forms (e.g., polygonal shapes, curvilinear shapes) mapped to different physical locations along the order lanes 20. The series of geometric forms may match between multiple cameras (e.g., cameras 114) that have different field of views in order to facilitate awareness, identification, and tracking of vehicles along the one or more paths between the starting location 32 and the ending location 34.

The drive through units 108 are interfaces that can be components of a communications system or POS system, shown as communications system 100 of the drive through system 10. In some embodiments, the drive through units 108 are integrated via one or more POS systems. The communications system 100 includes the drive through units 108, a controller 102, one or more imaging devices 114 (e.g., cameras) positioned about the lane system 16, a cloud computing system 104, one or more input devices, shown as order taking stations 110, and one or more wearable communications devices 112. In some embodiments, the one or more order taking stations 110 are disposed in each of a corresponding zone within the store 14 proximate the windows 28. The order taking stations 110 may include a touch screen or user interface configured to both display image data (e.g., a graphical user interface, a menu, selectable options for an order or POS, etc.), and receive user inputs from a corresponding employee of the store 14 to add items to an order or POS.

The wearable communications devices 112 may have the form of headphones, earpieces, etc., and can include both speakers (e.g., acoustic transducers, output devices, etc.) and microphones (e.g., input devices). In some embodiments, the controller 102 is communicably coupled with each of the order taking stations 110 at the windows 28, the imaging devices 114, and the head wearable communications devices 112. The controller 102 may also be communicably coupled with a cloud computing system 104 and can upload or provide various information regarding points of sale to the cloud computing system 104 for analysis. In some embodiments, the controller 102 is configured to receive, from the cloud computing system 104, software or firmware updates for various devices of the communications system 100. In some embodiments, the wearable communications devices 112 can be portable communications devices including but not limited to headphones, earphones, earbuds, devices configured to clip to a belt or article of clothing, ear pieces, etc., any device having at least one of a speaker or microphone and configured to be worn, held, or otherwise move with an individual to establish an end point for audio communications (e.g., to at least one of produce sound via a speaker, or receive a sound input via a microphone). It should be understood that the components of the communications system 100 (e.g., the drive through units 108, the controller, the one or more imaging devices 114, the cloud computing system 104, the order taking stations 110, and the wearable communications devices 112) may optionally be integrated with each other via a POS (e.g., all such components or a subset of the foregoing components). Integrating the components of the communications system 100 via the POS may facilitate improved efficiency of the drive through, for example.

The communications system 100 provides selective communicability according to multiple channels between any of the personnel (e.g., personnel 40a at the first window 28a, personnel 40b at the second window 28b, and personnel 30c at the third window 28c) and customers at one of the order zones (e.g., the first order zone 24a, the second order zone 24b, the third order zone 24c, and the fourth order zone 24d) via the wearable communications devices 112 and the drive through units 108. In some embodiments, each of the drive through units 108 is configured to communicate according to a corresponding channel (e.g., a first order channel, a second order channel, a third order channel, and a fourth order channel) and the personnel at the windows 28 can selectively establish communicability with the customers at the different order lanes 20 by selectively switching between the channels such that the wearable communications devices 112 are communicatively coupled on a selected one of the channels. In some embodiments, the communications system 100 also facilitates private communication between one or more of the personnel 40 within the store 14 or at other remote locations (e.g., a service center). For example, the personnel may include a kitchen personnel 40d that may communicate with any of the personnel 40a, the personnel 40b, or the personnel 40c at the windows 28 via one or more remote channels. In some embodiments, the kitchen personnel 40d may also listen on one or more of the channels on which the customers at the zones 24 can communicate.

Referring particularly to FIG. 2, one of the order zones 24 is shown in greater detail, according to some embodiments. The order zones 24 may include a space or surface of the order lane 20 for the customer, shown as vehicle 30 to pull up and place an order. The order zone 24 may include at least one pressure or force sensor 106. The at least one pressure or force sensor 106 is configured to detect the presence of the vehicle 30 and notify the controller 102 that a customer has arrived to the specific order zone 24 (e.g., pulled up, reversed into, merged into, parked in, etc.). The order zones 24 may also include one or more imaging devices 114 (e.g., cameras, image sensors, sensor arrays) for detecting the presence of the vehicle 30. The drive through units 108 include a display screen 118 configured to display a current order, items in the order, and cost of the order or other aspects of an order property, alone or in any combination. The display screen 118 can be operable by one or more of the personnel 40 who is taking the customer's order. In some embodiments, the order zones 24 may optionally include at least one pressure sensor and/or at least one magnetic ground loop. For example, if the order zones 24 already include a pressure sensor and/or a magnetic ground loop, the controller 102 may communicate with and use feedback from the pressure sensor and/or the magnetic ground loop.

In some embodiments, the order zones 24 may lack both a pressure sensor and/or a magnetic ground loop.

The drive through unit 108 may also include a microphone 122 configured to capture audio (e.g., spoken audio) from the customer and transmit data (audio data, audio signals) to the personnel 40 that is taking the customer's order via a corresponding channel of the communications system 100 for the order lane 20 of the order zone 24. In some embodiments, the drive through unit 108 also includes a speaker 120 configured to provide audio data of the voice or spoken words of the personnel 40 obtained by the wearable communication device 112 that is communicating on the channel of the drive through unit 108. In this way, the communications unit 108 may provide a customer end for audio communications and the wearable communications device 112 may provide a personnel end for audio communications between the customer and one of the personnel 40 (e.g., according to an audio or communications channel). In some embodiments, the at least one pressure or force sensor 106, the speaker 120, the microphone 122, the imaging device 114, and the display screen 118 are configured to communicate directly with the controller 102 of the communication system 100. In some embodiments, the pressure or force sensor 106, the speaker 120, the microphone 122, the imaging device 114, and the display screen 118 are configured to communicate with a zone controller 124 that communicates with the controller 102.

Referring again to FIG. 1, the controller 102 and the imaging devices 114 may form a vision system 200. The vision system 200 can be implemented on the controller 102 based on image data received from the imaging devices 114. In some embodiments, the vision system 200 is configured to integrate with one or more POS units of the communications system 100, such as the order taking units 110. The vision system 200 is configured to track vehicles or customers through the drive through system 10 (e.g., along different lanes) and integrate with a POS system. The vision system 200 may trigger notifications to the personnel 40. In some embodiments, the vision system 200 is configured to notify the personnel 40 regarding the presence of a vehicle at one of the drive through units 108. In some embodiments, the vision system 200 is configured to identify which vehicle has arrived at a pickup window and notify associated personnel 40 regarding which order the vehicle at the pickup window should receive. In some embodiments, the vision system 200 is configured to prompt the personnel 40 to open another order taking or drive through lane. In some embodiments, the vision system 200 is configured to notify the kitchen personnel 40d regarding arrival of multiple vehicles 30 to the drive through system 10 to prompt the kitchen personnel 40d to begin preparing food in advance.

Advantageously, the vision system 200 may track vehicles through the drive through system 10 and integrate with POS systems of the drive through system 10. The vision system 200 may facilitate improved order taking, speed of service, and fulfillment accuracy. The vision system 200 can integrate directly with the POS units such that graphical user interfaces of the POS units can be updated in real-time based on tracking of vehicles 30 through the drive through system 10 by the vision system 200.

Vision System

Figure 3:
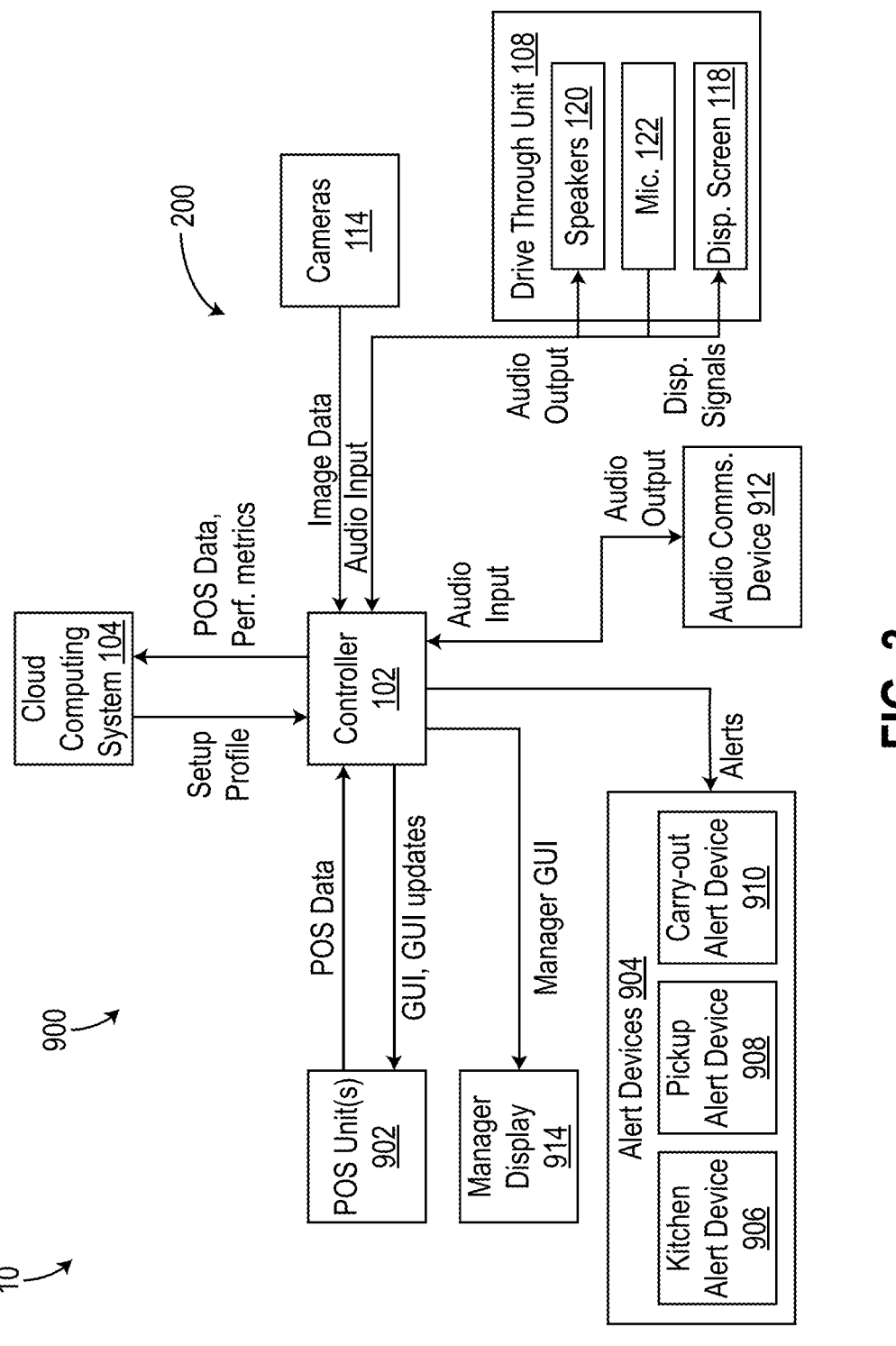
FIG. 3 is a block diagram of a point of sale system for the drive through system of FIG. 1 that integrates a vision system with point of sale units, according to some embodiments.

Referring to FIG. 3, the cloud computing system 104 may provide the setup profile to the controller 102 once the setup profile is fully generated. In some embodiments, the controller 102 and the vision system 200 are integrated into a POS system 900 of the drive through system 10. The controller 102 is configured to use the setup profile in order to control operation of one or more POS units 902. The controller 102 may also control operation of one or more alert devices 904 of the store 14 to provide feedback to employees of the store 14. The controller 102 receives image data from the cameras 114 and uses the setup profile with the image data to track vehicles 30 through the drive through system 10. In some embodiments, the controller 102 is configured to control operation of the POS units 902 based on the tracking and location of different vehicles 30 through the drive through system 10.

The POS units 902 can be positioned at any windows (e.g., windows 28) of a restaurant or store. For example, both pickup windows at which orders are fulfilled and payment windows at which customers pay for their items may include corresponding POS units 902, in addition to other display screens. In another example, pickup windows (e.g., an order fulfillment window) may include both a display screen (e.g., a kitchen display screen, a tablet, a fulfillment display screen, etc.) and a POS unit 902. The display screens and the POS units 902 can be operated by the controller 102 based on the image data from the cameras 114 in order to provide characteristics of the vehicles 30 (e.g., type and color) according to one or more modalities (e.g., textual information, visual information such as icon that represent the characteristics of the vehicles 30). The display screens and the POS units 902 can be operated based on tracking the vehicles 30 in a virtual space based on the zones that are defined when setting up the profile for the image data of each of the cameras 114. As described in greater detail above, the zones can be defined differently for the image data of each camera 114 in order to account for different perspectives, orientations, positions, fields of view, etc., of the cameras 114 which results in the image data of the zones spanning different areas of the image data (e.g., different pixel regions). The definition of the zones accounts for the different locations, sizes, etc., of the image data of the zones in the image data of the cameras 114 such that the controller 102 can consistently track vehicles 30 through the drive through system 10 from camera to camera. The definition of the zones facilitates seamless tracking of the vehicles 30 through the drive through system 10 despite different perspectives and positioning of the camera 114.

The controller 102 may obtain the image data from each of the cameras 114 in real-time. In some embodiments, when a vehicle 30 first arrives at the drive through system 10, the controller 102 may use an initial image of the vehicle 30 to determine (1) a color of the vehicle 30, and (2) a type of the vehicle 30. In some embodiments, the controller 102 is configured to implement an image analysis technique using the initial image of the vehicle 30 to determine (1) the color of the vehicle 30, and (2) the type of the vehicle 30. In some embodiments, the controller 102 includes different predetermined colors such as red, blue, orange, black, white, green, etc. In some embodiments, the controller 102 is configured to determine, using the image analysis technique and the initial image of the vehicle 30, a correspondence between one of the predetermined colors and the color of the vehicle 30. In some embodiments, the controller 102 includes different predetermined types of vehicles such as car, truck, SUV, Jeep, etc. In some embodiments, the controller 102 is configured to determine, using the image analysis technique and the initial image of the vehicle 30, a correspondence between one of the predetermined types of vehicles and the vehicle type of the vehicle 30.

In some embodiments, the controller 102 is configured to use the paths and zones along the paths in the setup file to track location of the vehicle 30 throughout a lifecycle of the vehicle 30. In some embodiments, the controller 102 is configured to track which of the zones the vehicle 30 travels along or at which the vehicle 30 is currently located. For example, the controller 102 may identify that the vehicle 30 is traveling along the first order lane path 804a by detecting the vehicle 30 at zones along the first order lane path 804a. In some embodiments, the controller 102 is configured to use the image analysis techniques and one or more locations of interest (e.g., tagged or identified zones) to determine if the vehicle 30 has arrived at a specific location. The controller 102 may use the locations of interest (e.g., the tagged or identified zones) and the detection of the vehicles 30 at the locations of interest to operate corresponding POS units 902, or the alert devices 904. For example, in response to detecting that the vehicle 30 has arrived at a first order location, the controller 102 may operate corresponding POS units 902 to notify staff (e.g., order taking staff) that the vehicle 30 is awaiting service at a particular drive through unit 108. The controller 102 may operate the POS units 902 to notify the order taking staff regarding the color and the type of the vehicle 30 that is at the particular drive through unit 108. In this way, the vision system 200 (e.g., the image data of the cameras 114, the image analysis and tracking techniques performed by the controller 102, etc.) can be integrated with the POS units 902 of the store 14. The POS units 902 can be display screens, the order taking stations 110, etc.

In some embodiments, the POS units 902 can be operated by the order taking staff. POS data resulting from the POS units 902 can be provided to the controller 102. The controller 102 may operate alert devices 904 responsive to at least one of the POS data obtained from the POS units 902, or based on results of the image analysis techniques performed using the image data.

In some embodiments, the controller 102 is configured to operate a pickup alert device 908 or a carry-out alert device 910. In some embodiments, the pickup alert device 908 is a display screen positioned proximate a window at which the vehicle 30 pulls up or arrives at in order to receive their order. The controller 102 may track the vehicle 30 to the window, and in response to the vehicle 30 arriving at the window, operate the pickup alert device 908 to display the color of the vehicle 30 and the type of the vehicle 30 that is at the window. In some embodiments, the controller 102 is also configured to operate the pickup alert device 908 to display POS data such as an order number, items in the order, a name of the customer in the vehicle 30, etc. In this way, the POS data of the customer in the vehicle 30 can be tied to the detected color and/or type of the vehicle 30, which can be displayed to staff as the staff fulfill the order to the customer in the vehicle 30. Advantageously, displaying POS data (e.g., order information) in combination with characteristics of the vehicle 30 to receive the order (e.g., the type and color of the vehicle 30) facilitates accurate order fulfillment and reduces a likelihood of the incorrect order or items being handed to customers.

Referring still to FIG. 3, the controller 102 is also configured to operate the carry-out alert device 910 to notify carry out staff regarding a customer awaiting carry out. In some embodiments, for example, during busy times of the day, the staff may instruct customers in the vehicles 30 to pull around to the pickup location 806. The controller 102 may receive an input from the POS units 902 that a specific customer has been asked to pull to the pickup location 806. The controller 102 is configured to track the vehicle 30 of the specific customer as the vehicle 30 travels to the pickup location 806, and identify a zone at which the vehicle 30 parks (e.g., which of the parking spots 808 that the vehicle 30 parks at). The controller 102 may operate the carry-out alert device 910 to notify the carry out staff regarding the POS data (e.g., the order data, a customer's first name, etc.), the characteristics of the customer's vehicle 30 (e.g., the color and/or type of the car), as well as which of the parking spots 808 that the vehicle 30 has parked at. In some embodiments, the carry-out alert device 910 is a display screen (e.g., a touch screen, a user interface, etc.). The carry-out alert device 910 may provide the POS data, the characteristics of the customer's vehicle 30, and which of the parking spots 808 the vehicle 30 is located by presenting textual information, a graphical representation of the vehicle 30 and the corresponding parking spot 808, or any combination thereof.

Referring still to FIG. 3, the controller 102 may also operate the drive through unit(s) 108 and one or more audio communications devices 912. In some embodiments, the audio communications devices are wearable headphones or wearable communications devices configured to be worn by staff or personnel of the store 14 in order to establish communications with the drive through units 108 (e.g., audio communications). The audio communications devices 912 may each include one or more speakers and one or more microphones for providing and obtaining audio (e.g., the microphones are configured to obtain audio input, and the speakers are configured to provide audio output). The drive through units 108 may similarly include speakers and microphones for providing a second end of audio communications. In some embodiments, the controller 102 is configured to implement one or more audio channels to facilitate bi-directional audio communication between the audio communications devices 912 and the drive through units 108. In some embodiments, the audio communications device 912 are operated based on the vehicle 30 detected at an order location by the controller 102 to prompt the order taker to switch to a channel to take the customer's order.

The controller 102 may also be configured to count a number of customers (e.g., a number of vehicles 30) that are in line awaiting order. In some embodiments, the number of customers that are in line at the drive through system 10 awaiting their turn to place an order is referred to as a "stack size." In some embodiments, during busy times of day, the controller 102 may identify that a number of vehicles 30 have wrapped around the store 14, into a parking lot, onto the street, etc. The controller 102 may use the image data provided by the cameras 114 of surrounding areas of the store 14 (e.g., the parking lot, an adjacent road, an entrance to the parking lot, etc.), and determine the stack size of the drive through system 10. In some embodiments, the controller 102 is configured to record a time of day and corresponding stack size. The time of day and corresponding stack size can be used by the controller 102 in order to track busy times of day and initiate preparatory actions for preparing food and/or beverage items before the busy times of day.

In some embodiments, the controller 102 is configured to operate one or more kitchen alert devices 906 responsive to the stack size. In response to detecting a stack size above a threshold using the image data provided by the cameras 114, the controller 102 may initiate cooking operations by prompting kitchen staff to prepare food and/or beverage items. The controller 102 may initiate the cooking operations or preparatory actions (e.g., a kitchen action) by operating the one or more kitchen alert devices 906. In some embodiments, the controller 102 uses a predetermined set of instructions based on the stack size to determine which preparatory actions to initiate. For example, if the controller 102 includes historical data that 50% of customers typically order a specific type of food and/or beverage item that requires a significant amount of time to prepare, the controller 102 may prompt the kitchen staff, based on the stack size, to initiate preparation of a corresponding amount of the food and/or beverage item. In this way, the controller 102 may initiate kitchen options using the image data provided by the cameras 114. In some embodiments, the controller 102 is configured to operate the POS unit(s) 902 or a manager display screen 914 to display the stack size of the drive through system 10.

Figure 4:
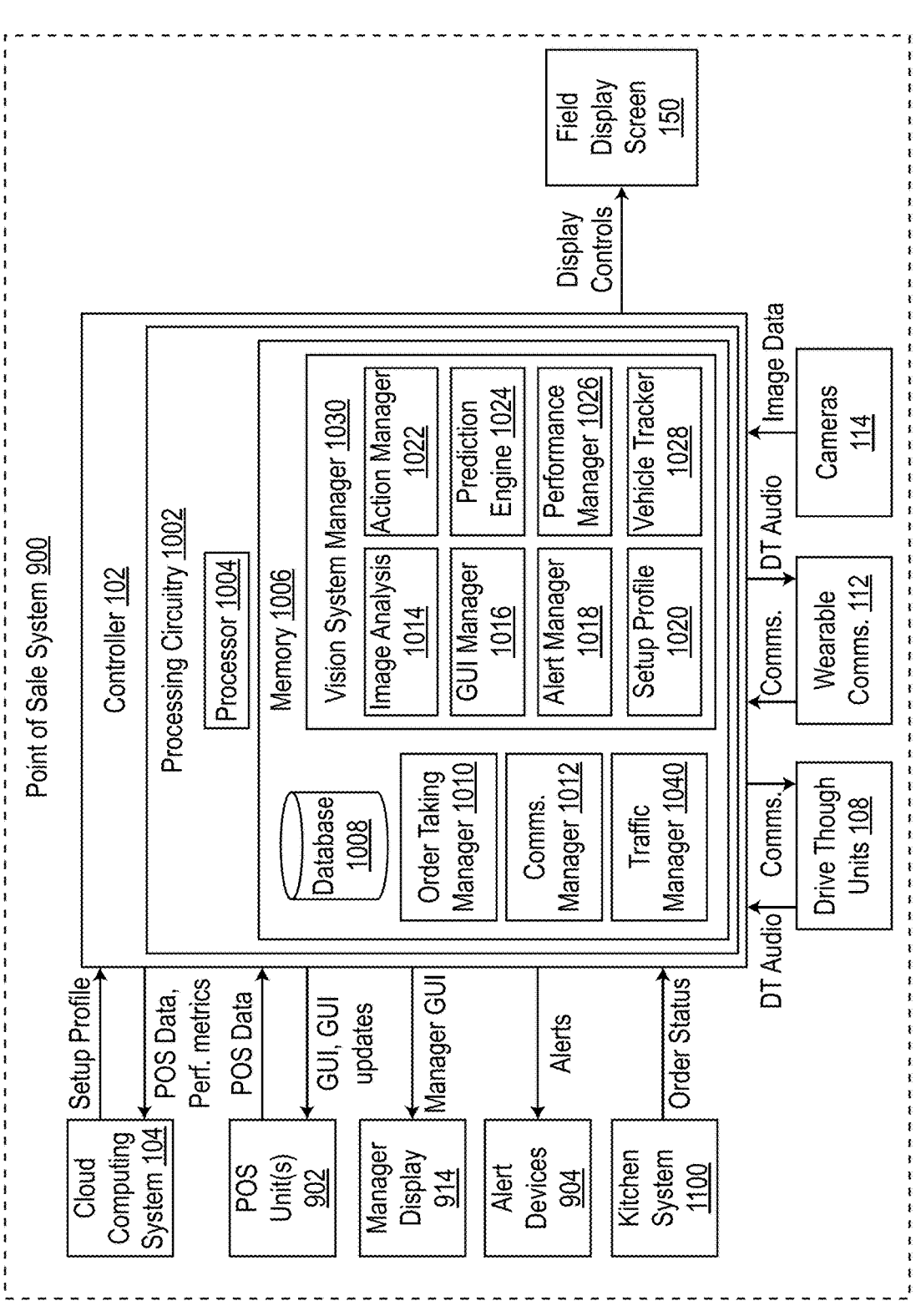
FIG. 4 is a block diagram of a controller of the point of sale system of FIG. 3, according to some embodiments.

Referring to FIG. 4, the POS system 900 is shown in greater detail. The controller 102 is shown to include includes processing circuitry 1002, a processor 1004, and memory 1006. Processing circuitry 1002 can be communicably connected to a communications interface such that processing circuitry 1002 and the various components thereof can send and receive data via the communications interface. Processor 1004 can be implemented as a general purpose processor, an application specific integrated circuit (ASIC), one or more field programmable gate arrays (FP-GAs), a group of processing components, or other suitable electronic processing components.

Memory 1006 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1006 can be or include volatile memory or non-volatile memory. Memory 1006 can include database components, object code components, script components, or any other type of information structure for supporting the various activities and information structures described in the present application. According to some embodiments, memory 1006 is communicably connected to processor 1004 via processing circuitry 1002 and includes computer code for executing (e.g., by processing circuitry 1002 and/or processor 1004) one or more processes described herein.

In some embodiments, controller 102 is implemented within a single computer (e.g., one server, one housing, etc.). In various other embodiments controller 102 can be distributed across multiple servers or computers (e.g., that can exist in distributed locations). For example, controller 102 can be made up of multiple controllers or microcontrollers that individually or collectively are configured to carry out operations as described herein.

The controller 102 is configured to obtain the setup profile from the cloud computing system 104, and store the setup profile in the memory 1006, shown as setup profile 1020. The controller 102 may use the setup profile in order to implement the techniques described herein, or to configure the controller 102 to implement the techniques as described herein. In some embodiments, the controller 102 is also configured to provide POS data and performance metrics to the cloud computing system 104. The controller 102 may also receive POS data or performance metrics of other drive through systems 10 from the cloud computing system 104.

The controller 102 includes a database 1008, an order taking manager 1010, a communications manager 1012, and a vision system manager 1030, according to some embodiments. The database 1008 can be configured to store POS data, menu data, performance data, historical metrics of busy times, inventory or stock, personnel identification, etc. In some embodiments, the order taking manager 1010 is configured to retrieve menu data from the database 1008 for use in constructing a GUI of the POS units 902, or to update the GUI of the POS units 902 (e.g., when an item is out of stock, when a price of the item has changed, etc.). In some embodiments, the order taking manager 1010 is configured to implement any of the techniques as described in U.S. application Ser. No. 17/325,871, now U.S. Pat. No. 11,244, 681, filed May 20, 2021, the entire disclosure of which is incorporated by reference herein.

Referring still to FIG. 4, the communications manager 1012 is configured to route traffic between the drive through units 108 and the wearable communications device 112. In particular, the communications manager 1012 may define various channels such that the wearable communications devices 112 are configured to switch between the various channels. Each of the drive through units 108 may communicate on an assigned channel that the wearable communications device 112 can switch between. In particular, the communications manager 1012 is configured to route audio traffic from the drive through units 108 (e.g., drive through audio) to the wearable communications devices 112 and vice versa (e.g., the communications provided by the wearable communications devices 112 are provided to the drive through units 108). In some embodiments, the switching of the wearable communications devices 112 is achieved by selection or input on the display screen of the POS units 902.

The vision system manager 1030 is configured to integrate the vision system 200 (e.g., the cameras 114) with the POS units 902. The vision system manager 1030 can be configured to implement an image analysis technique 1014 using the image data obtained from the cameras 114. In some embodiments, the image analysis technique 1014 is implemented using a neural network, a machine learning technique, a deep learning technique, an artificial intelligence, etc. The image analysis 1014 is configured to detect the presence of a vehicle in the image data provided by the cameras 114 as well as a color and/or type of the vehicle.

The vision system manager 1030 also includes a vehicle tracker 1028. The vehicle tracker 1028 is configured to use the setup profile 1020 (e.g., the zones of the setup profile 1020) and track the vehicles detected by the image analysis 1014 through the drive through system 10. In particular, the vehicle tracker 1028 may use the detection of the color and/or type of the vehicle 30 provided by the image analysis 1014 in combination with a map including the zones. The vehicle tracker 1028 may output notifications of the vehicle 30 traveling into zones of interest. The vehicle tracker 1028 is configured to track position, speed, change in position, etc., of the vehicles 30 in the drive through system 10.

The GUI manager 1016 is configured to use the tracking of the vehicles 30 provided by the vehicle tracker 1028 and the color and/or type of the vehicles 30 provided by the image analysis 1014 to generate or adjust the GUI that is provided to the POS units 902. In particular, when a vehicle arrives at one of the drive through units 108 as identified by the vehicle tracker 1028, the GUI manager 1016 may update a corresponding icon of the GUI that is displayed on the POS units 902 to visually indicate the color and/or type of the vehicle 30. The GUI manager 1016 may also adjust the GUI of the POS units 902 such that the POS units 902 display textual information of the color and/or type of the vehicle 30 at the drive through units 108. The order takers (e.g., users of the POS units 902) may select corresponding drive through units 108 via the POS units 902 in order to switch their wearable communications device 112 to the drive through unit 108 at which the vehicle 30 is detected.

In some embodiments, the order takers may initiate an order taking process for the customer of the vehicle 30 (e.g., by adding items to the order). Once the order taking process is complete, the POS unit 902 may provide the POS data (e.g., order information, order number, etc.) which is provided to the database 1008 and the vehicle tracker 1028. The vehicle tracker 1028 may record an identifier of the POS data and tie the POS data with the vehicle 30. In this way, as the image analysis 1014 continues to use newly obtained image data to identify the vehicle 30 in the image data, and the vehicle tracker 1028 tracks the vehicle 30 through the drive through system, the POS data (e.g., order data, customer name, items in order, total cost, etc.) can be linked with the vehicle 30. Responsive to the vehicle tracker 1028 indicating that the vehicle 30 has arrived at a pay window or a pickup window (e.g., the first window 28a, the second window 28b, etc.), the GUI manager 1016 may operate POS units 902 to indicate that the vehicle 30 (with the linked POS data) has arrived at the pay window or the pickup window. Advantageously, the POS units 902 are integrated with the vision system 200 such that the POS units 902 can be updated responsive to tracking of vehicles 30 through the drive through system 10. Similarly, the vehicle tracker 1028 may track vehicles through the drive through system 10 while linking the POS data of the vehicle 30 with the tracking. The GUIs that are generated by the GUI manager 1016 based on results of the vision system manager 1030 using the image data can be any of the GUIs described in greater detail below with reference to FIGS. 12-15.

In some embodiments, the GUI manager 1016 is also configured to generate a manager GUI and operate the manager display screen 914 to provide the manager GUI. The manager GUI can be any of the GUIs described in greater detail with reference to FIGS. 16-18. In some embodiments, the manager display screen 914 is a separate display screen that is presented to all personnel of the store 14 on a separate display screen. In some embodiments, the manager display screen 914 is a store manager or administrator's display screen that is accessible remotely (e.g., via the cloud computing system 104). The manager GUI generally displays an overall map of the drive through system 10, icons of detected vehicles along the map of the drive through system 10 that visually indicate colors and/or types of the vehicles, and POS data for each of the vehicles 30 (e.g., an indication).

In some embodiments, the POS data includes order data that can be selected and viewed by selecting the icons of the manager GUI. In some embodiments, the manager GUI is generated by the GUI manager 1016 using results of the vehicle tracker 1028, the image analysis 1014, the POS data, and the setup profile 1020. The manager GUI may include a visualization (e.g., textual, an icon, etc.) of a stack size of vehicles 30 in the drive through system 10. The stack size indicates a number of vehicles 30 that are beyond a certain point (e.g., upstream of the drive through units 108, upstream of an entrance of the drive through system 10, etc.) or between other vehicles 30 in the drive through system 10. The manager GUI may also display various performance metrics or characteristics of the drive through system 10. The manager GUI may also display vehicles 30 at a carryout (take-out, pick-up) location (e.g., that have been ordered by staff to pull to a parking spot) and vehicles awaiting a mobile pickup order.

The vision system manager 1030 includes a performance manager 1026 that is configured to use results of the vehicle tracker 1028 to determine one or more performance characteristics of the drive through system 10. In some embodiments, the performance manager 1026 is configured to identify, based on the results of the vehicle tracker 1028, when a vehicle arrives at an entry point of the drive through system 10. The performance manager 1026 may record a time at which each vehicle arrives at the entry point. The time at which the vehicle 30 arrives at the entry point can be linked to the particular vehicle 30. The performance manager 1026 may also record a time at which the vehicles 30 each arrive at one of the drive through units 108. The performance manager 1026 may also record a time at which the customers in the vehicles 30 begin their order (e.g., once the order taker switches to communicating via the drive through units 108). The performance manager 1026 can also record a time at which the customers in the vehicles 30 complete their order. The performance manager 1026 may also record a time at which the customers in the vehicles 30 arrive at a first window (e.g., a payment window) and a second window (e.g., a pickup window). The performance manager 1026 may also record a time at which the customers in the vehicles 30 have their orders fulfilled. In some embodiments, the performance manager 1026 is configured to use any of the recorded times to estimate various quantities of elapsed time. For example, the performance manager 1026 may estimate a total amount of time that it takes each vehicle 30 to enter the drive through system 10, place their order, pick up their order, and exit the drive through system 10. The performance manager 1026 may determine an average amount of time it takes a vehicle to arrive, order, receive their order, and exit the drive through system 10. In some embodiments, the performance manager 1026 is configured to track any of a number of vehicles that are commanded to pull over to a pickup location, a number of vehicles 30 that leave the drive through system 10 without ordering (e.g., due to the line being too long), an average amount of time that a customer waits at the drive through units 108 to begin placing an order, an average amount of time it takes a customer to place their order once initiated, a number of vehicles 30 in the drive through system 10, a number of customers served so far for the day, etc. The data collected by performance manager 1026 can be used for historical data analysis, benchmarking, and statistical analysis, for example.

The performance manager 1026 can be configured to provide any of the performance characteristics or metrics described herein to the cloud computing system 104. The performance manager 1026 may receive performance metrics or rankings of the store 14 from the cloud computing system 104. For example, the ranking may indicate which place the store 14 is in relative to other stores in the area or in a chain. The ranking of the store 14 can be determined based on any of the performance metrics or characteristics described herein (e.g., average time for a customer to enter the drive through system 10, place their order, receive their order, and leave the drive through system 10).

In some embodiments, the performance manager 1026 is configured to provide any of the performance characteristics or metrics of the drive through system 10 to the GUI manager 1016 for display on the POS units 902 or the manager display screen 914. In some embodiments, the performance manager 1026 is configured to store any of the performance metrics or characteristics of the drive through system 10 in the database 1008. The performance manager 1026 may also provide ranking of the drive through system 10 to the GUI manager 1016 for display on the POS units 902 or the manager display screen 914.

The vision system manager 1030 may include a prediction engine 1024, an action manager 1022, and an alert manager 1018, according to some embodiments. In some embodiments, the prediction engine 1024 is configured to use historical (e.g., seasonalized historical data) of demand at the drive through 10 to predict one or more actions that should be taken by kitchen staff or personnel of the drive through system 10. For example, the prediction engine 1024 may predict busy times, and provide the results of the predicted busy times of the store 14 to the action manager 1022. The action manager 1022 is configured to use the results of the prediction engine 1024 in order to identify actions that should be taken to prepare for busy times of the store 14, and prompt the alert manager 1018. The alert manager 1018 is configured to provide alerts to the alert devices 904 to notify staff of the store 14 regarding the identified actions. Identified actions may include preparation of certain food and/or beverage items, an amount of food and/or beverage items to be prepared, sending out line busters with handheld POS units, opening new lanes, etc.

The action manager 1022 may use outputs from the prediction engine 1024 and may also use outputs from the performance manager 1026. In some embodiments, outputs of the performance manager 1026 include the stack size, and indicate real-time or current data of the drive through system 10 as opposed to predicted data. In some embodiments, the action manager 1022 may defer to using results of the performance manager 1026 which indicate real-time performance metrics as opposed to using the outputs of the prediction engine 1024. For example, if the prediction engine 1024 predicts, based on historical data, that there is a likelihood that ten customers are present in the drive through system 10 at a current time, but the image data indicates that twenty-five customers are present in the drive through system 10 (e.g., as indicated by the outputs of the performance manager 1026), the action manager 1022 may use the results of the image data instead of the outputs of the prediction engine 1024. In some embodiments, the action manager 1022 is configured to use a machine learning technique in order to determine one or more cooking or kitchen operations that should be performed responsive to number of customers in the drive through system 10. For example, the action manager 1022 may use a known percentage of customers that will order a specific type of food and/or beverage item, and initiate preparation of a corresponding amount of the specific type of food and/or beverage item based on the number of customers in the drive through system 10.

The action manager 1022 may also determine if it is appropriate to open an additional lane based on the current number of customers. In some embodiments, the action manager 1022 is configured to observe the average amount of time for a customer to enter the drive through system 10, place their order, receive their order, and exit. In response to the average amount of time exceeding a threshold, the action manager 1022 may determine that the additional lane should be opened, and may either initiate the opening of the additional lane automatically, or may prompt a store manager to open the additional lane. Similarly, the action manager 1022 may initiate or prompt opening the additional lane in response to the total number of customers in the drive through system 10 exceeding a threshold or in response to the stack size exceeding a threshold.

The alert manager 1018 is configured to receive actions or determinations of the action manager 1022, and operate the alert devices 904 to prompt staff to perform the action(s) determined by the action manager 1022. For example, the alert devices 904 can be kitchen alert devices such that the alert manager 1018 initiates preparation of food and/or beverage items in accordance with the determinations of the action manager 1022. Similarly, the alert devices 904 can be alert devices for order takers or staff personnel to open new lanes. In some embodiments, the GUI manager 1016 is configured to operate the manager GUI to prompt the manager to initiate opening the additional lane. The manager of the store can be presented with a request to open the additional lane, and provide via the manager display screen 914 confirmation to open the additional lane. Responsive to receiving the confirmation from the manager, the alert manager 1018 may operate the alert devices 904 to notify order taking personnel to open the additional lane.

Traffic Control Management

Referring still to FIG. 4, the controller 102 is configured to implement traffic control of the drive through system 10, according to some embodiments. The controller 102 may implement traffic control to route the vehicles 30 between different locations, lanes, windows, etc., of the drive through system 10 by providing feedback to the drivers of vehicles 30. In particular, the controller 102 operates the drive through units 108 to prompt the drivers of vehicles 30 regarding which of the zones 26 to travel to. The feedback may include any of visual feedback (e.g., display screen operation, lighting or alert device operation, etc.) or audible feedback (e.g., operating a speaker to provide a command or instruction to the vehicles 30). The feedback is determined by the controller 102 autonomously such that the traffic of the drive through system 10 can be autonomously controlled in order to decrease wait times for the customers. Advantageously, the controller 102 may autonomously direct the flow of traffic through the drive through system 10 so that order takers or staff of the store 14 can focus on taking orders and fulfilling the customers' orders accurately instead of directing traffic.

Referring still to FIG. 4, the controller 102 also includes a traffic manager 1040, according to some embodiments. The traffic manager 1040 is configured to obtain the image data, or results from the vision system manager 1030, data from a kitchen system 1100 of the store 14, and point of sale data from the order taking manager 1010 (or from the POS units 902). The traffic manager 1040 is configured to control operation of the drive through units 108, or more specifically, the display screen 118 and the speakers 120 of the drive through units 108. For example, the traffic manager 1040 may operate the display screen 118 and the speakers 120 to instruct the customers in the vehicles 30 to stay at the drive through units 108, when to leave the drive through units 108, and which of the windows 28 to pull up to.

Figure 5:
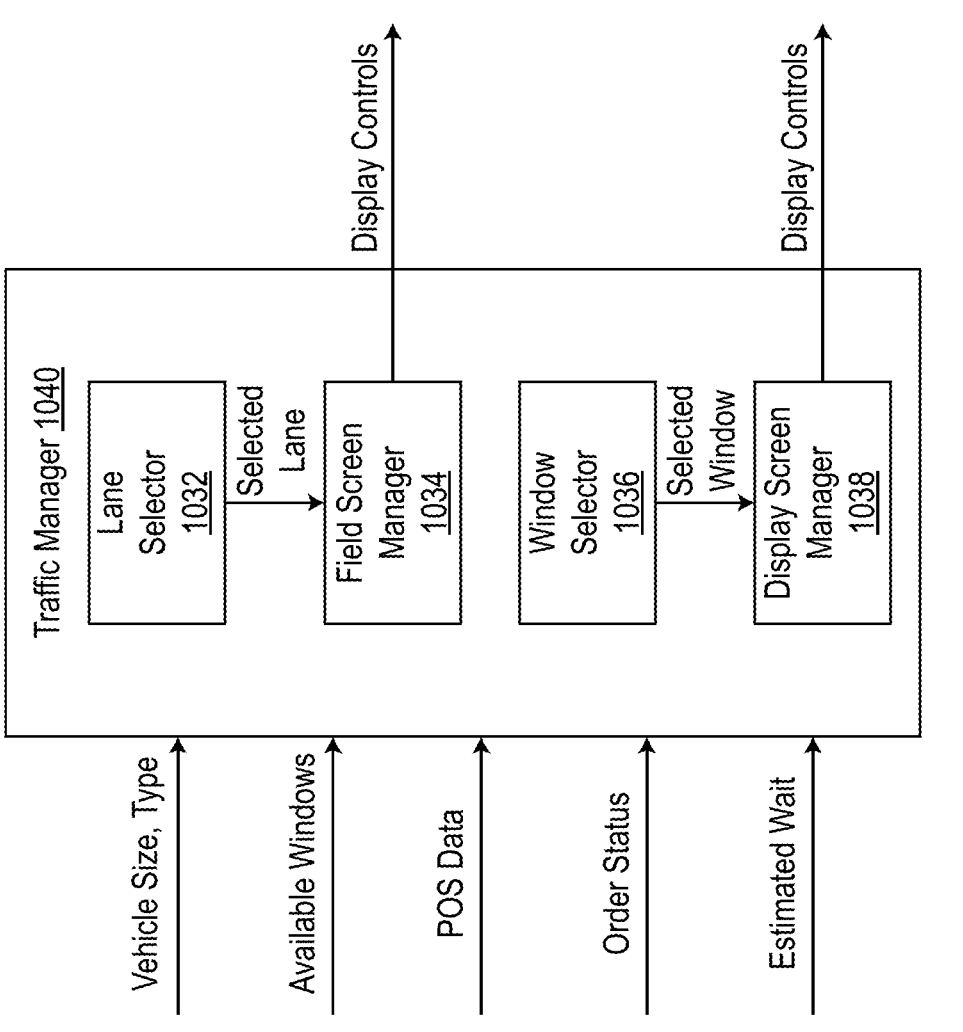
FIG. 5 is a diagram of a traffic manager of the controller of FIG. 3, according to some embodiments.

Referring still to FIGS. 4 and 5, the traffic manager 1040 includes a lane selector 1032, a field screen manager 1034, a window selector 1036, and a display screen manager 1038. The display screen manager 1038 can receive point of sale data from a point of sale system (e.g., the order taking manager 1010, the POS units 902, etc.). The display screen manager 1038 is also configured to receive notifications of one or more order numbers or order identifiers associated with the vehicle 30. The display screen manager 1038 is also configured to receive, from the kitchen system 1100, a status of orders that are being prepared in the kitchen of the store 14, according to some embodiments. The display screen manager 1038 is configured to determine, based on the order number or order identifiers associated with the vehicle 30 at a particular one of the drive through units 108, and the order statuses provided by the kitchen system 1100, if the orders for the vehicle 30 at the drive through unit 108 is ready. If the order status provided by the kitchen system 1100 indicates that the preparation of order has not yet commenced, or that the order is in the process of being prepared but is not completed, the display screen manager 1038 operates the display screen 118 of the drive through unit 108 to prompt the vehicle 30 to stay at the drive through unit 108 (in the form of a positive instruction such as "wait" or "remain" or a negative instruction such as "do not move forward").

For example, the display screen manager 1038 can be configured to provide display controls to notify the vehicle 30 at the corresponding drive through unit 108 that the order is not yet ready and that the customer should keep their vehicle 30 parked at the drive through unit 108. The display screen manager 1038 uses feedback from the POS units 902 (e.g., order number) in order to identify an order number for the customers at each of the drive through units 108. The display screen manager 1038 also uses feedback from the kitchen system 1100 to determine the status of the order for the vehicles 30 at each of the drive through units 108. The display screen manager 1038 is configured to provide display controls to the display screens 118 of each of the drive through units 108 in order to notify the customers whether to wait at the drive through units 108. In some embodiments, the display screen manager 1038 is configured to operate the display screens 118 to direct the customers to remain at the drive through units 108 until the customer's order is ready. In some embodiments, one or more of the vehicles 30 include multiple orders. For example, the vehicle 30 at one of the drive through units 108 may include separate orders for multiple passengers in the vehicle 30. The display screen manager 1038 is configured to associate each of the multiple orders with the vehicle 30 and operate the display screen 118 to direct the vehicle 30 to stay at the drive through unit 108 until all of the orders associated with the vehicle 30 are ready. The display screen manager 1038 is configured to direct the vehicles 30 to remain at the drive through units 108 until their orders are ready by providing text or icons via the display screens 118 (e.g., providing a stop sign on the display screens 118, providing textual information to remain parked, etc.). The display screen manager 1038 can also be configured to provide audio controls to speakers 120 of the drive through units 108 to provide an audible directive to the vehicles 30 to remain at the drive through units 108 until their order is ready (e.g., providing a spoken prompt such as "stay here while we prepare your order.").

The window selector 1036 is configured to determine which of the windows 28 to which the vehicle 30 should be deployed. The window selector 1036 also determines when the vehicles 30 should be deployed from their drive through units 108 to the windows 28. The window selector 1036 coordinates deployment of the vehicles 30 from the drive through units 108 to the windows 28. The window selector 1036 is configured to select which of the window 28*a*, the window 28*b*, or the window 28*c* a particular vehicle 30 should be deployed to, and provide the display screen manager 1038 with the selected window at a time at which the vehicle 30 should be deployed. The display screen manager 1038 transmits the selected window to each of the drive through units 108 (e.g., to the display screens 118) such that the drive through units 108 prompt the vehicles 30 which window 28 to pull up to, and when to leave the drive through units 108.

The window selector 1036 is configured to use the image data from the vision system manager 1030, or more specifically, one or more characteristics identified by the vision system manager 1030, according to some embodiments. In some embodiments, the window selector 1036 uses an indication of available windows from the vision system manager 1030. For example, the vision system manager 1030 may identify, based on zones proximate the windows 28, which of the windows 28 is open (e.g., available). In particular, the vision system manager 1030 may determine, in real-time, which of the windows 28 does not have a vehicle alongside it, and whether a path from the drive through units 108 to the windows 28 is clear. The window selector 1036 is configured to select one of the windows 28 (e.g., one of the zones proximate the windows) and direct the vehicles 30 to pull up to the selected windows 28 at different times. The display screen manager 1038 is configured to operate the display screens 118 of the drive through units 108 in order to prompt the customer to pull up to their assigned window 28. The display screen manager 1038 operates the display screens 118 of the drive through units 108 in a coordinated fashion so that the deployment of the vehicles 30 from their drive through units 108 to their assigned windows 28 is staggered. For example, the display screen manager 1038 may first operate the display screen 118 of the drive though unit 108 to prompt the vehicle 30 to travel to the third window 28*c* (i.e., the next destination for vehicle 30), then operate the display screen 118 of a different drive through unit 108 to prompt the vehicle 30 to travel to the second window 28*b*, and then operate a display screen 118 of a different drive through unit 108 to prompt a different vehicle 30 to travel to the first window 28*a*. Advantageously, the window selector 1036 and the display screen manager 1038 are configured to prompt the vehicles 30 when to leave the drive through units 108 and notify the vehicles 30 which window 28 to pull up to in a coordinated fashion to improve (shorten) cycle time of the drive through system 10.

The window selector 1036 may select which of the windows 28 to which to deploy the vehicles 30 based on a size of the vehicle 30 at the drive through units 108. In particular, the window selector 1036 may obtain vehicle size or type from the vision system manager 1030. If the vehicle 30 at one of the drive through units 108 is a large truck, the window selector 1036 may select the third window 28*c* (e.g., a window at the end of the line of windows 28) and direct the large truck to the third window 28*c*. The window selector 1036 may select the third window 28*c* for large vehicles since large vehicles occupy additional space and can block other customers. In this way, the window selector 1036 can select the windows 28 for the vehicles 30 based on the size of the vehicles 30.

The window selector 1036 may also select which of the windows 28 based on a length or complexity of the order. For example, the window selector 1036 may obtain the POS data from the order taking manager 1010, the POS units 902, or the cloud computing system 104, and determine, based on a complexity or length of the order, which of the windows 28 to which the vehicle 30 with the order should be directed. The window selector 1036 and the display screen manager 1038 may wait until the order is ready and the corresponding window 28 has a clear path to deploy the vehicle 30 to the corresponding window 28. Once the customer's order or all orders associated with the vehicle 30 are ready, the display screen manager 1038 operates the display screen 118 to notify the customer at the vehicle 30 which window the vehicle 30 should pull up to in order to pick up their order.

In some embodiments, the traffic manager 1040 does not implement the direction of traffic from the drive through units 108 to the windows 28 until the customers have paid at the drive through units 108. For example, the drive through units 108 can be equipped with point of sale units (point of sale interfaces) and allow the customers to pay with card, their phone, etc. If the customers opt to pay with cash, the customers can be directed to a specific window that has a cashier (e.g., the third window 28*c*). In this way, the window selector 1036 may also select which of the windows 28 to prompt the customers to, based on a payment type and available equipment for receiving that payment type at the different windows 28. In some regions or areas of the world, all of the customers pay at the windows 28 and the traffic manager 1040 does not wait until payment at the drive through unit 108 is completed. Orders that have cash payment can be assigned a different status than orders where other payment forms are used without requiring a manual exchange of currency between the customer and a cashier.

Referring to FIGS. 1, 4, and 5, the drive through system 10 may include a field display screen 150 positioned at an entrance of the order lanes 20. The field display screen 150 can be operated by the traffic manager 1040 in order to keep customers at the entrance to the order lanes 20 until directed to a specific drive through unit 108 by the field display screen 150. The traffic manager 1040 may receive, from the vision system manager 1030, an indication of a number of vehicles in each of the order lanes 20. The lane selector 1032 is configured to select one of the multiple order lanes 20 based on the number of vehicles in each of the order lanes 20 and provide the selection to the field screen manager 1034. The field screen manager 1034 is configured to operate the field display screen 150 in order to notify the incoming vehicle 30 regarding which order lane 20 to enter (e.g., and which drive through unit 108 to go to). The field screen manager 1034 may select an order lane 20 with a currently lowest number of vehicles or shortest line. Advantageously, the lane selector 1032 and the field screen manager 1034 operate the field display screen 150 in order to keep the distribution of vehicles 30 between the order lanes 20 even (e.g., direct the incoming customers to the shortest lines). The lane selector 1032 and the field screen manager 1034 are configured to provide the display controls to the field display screen 150 to reduce buildups in specific order lanes 20 and keep the drive through system 10 operating smoothly. It should be noted that in one or more embodiments, the lanes can be demarcated through markings on a travel surface, physical barriers, cones, or a combination thereof, or alternatively, no demarcation may be present.

The field screen manager 1034 may also receive an estimated wait time or business level from the vision system manager 1030 (e.g., from the performance manager 1026). The estimated wait time may indicate an average amount of time for customers to enter the drive through system 10, place their order, receive their fulfilled order, and leave the drive through system 10. The field screen manager 1034 is configured to operate the field display screen 150 in order to notify incoming customers regarding the estimated wait time. The customers can be provided with the estimated wait time or business level before entering the drive through system 10 so that the customers are notified of an expected amount of time they will likely spend in the drive through system 10.

The traffic manager 1040 is advantageously configured to operate autonomously without requiring user input. However, the traffic manager 1040 can advantageously operate dynamically using real-time inputs. Accordingly, if a customer in a vehicle disobeys or ignores the recommendations of the traffic manager 1040, or is directed by an employee of the drive through system 10 in a manner inconsistent with the traffic manager 1040, the traffic manager 1040 may receive real-time inputs from the vision system manager 1030 and react accordingly.

Referring to FIGS. 1, 4, and 5, the traffic manager 1040 may select windows (e.g., the window selector 1036) using a preferred or default window. For example, the traffic manager 1040 may default to selecting the second window 28b when the second window 28b is available. If an especially large vehicle is detected (e.g., a truck) that may take up multiple spaces at the windows 28, the window selector 1036 may select the third window 28c and direct the truck to the third window 28c. If another vehicle 30 is ready to pick up their order, there may not be sufficient space at the second window 28b when the truck is parked at the third window 28c. The traffic manager 1040 can begin routing vehicles 30 to the first window 28a. Once the truck has left the third window 28c, the traffic manager 1040 can begin to again direct vehicles 30 to the second window 28b (e.g., the default window). Similarly, if a customer indicates that they would like to pay with cash, the traffic manager 1040 may direct that vehicle 30 to one of the windows 28 that accepts cash payment (e.g., the third window 28c). In this way, the traffic manager 1040 can direct vehicles 30 based on type or size of the vehicles 30 as well as based on desired payment type for the vehicles 30.

In some embodiments, the traffic manager 1040 is configured to direct the vehicles 30 to begin to pull up to the identified window 28 before or as a vehicle 30 that is currently at the identified window 28 is pulling away. In some embodiments, the traffic manager 1040 is configured to receive an input from the POS system 1200 or the vision system 200 that the customer at the window 28 has received their order and is about to pull away, or has begun pulling away. The POS system 1200 or the vision system 200 may detect that the customer at the window 28 has received their order based on image data indicating that the order has been handed to the customer in the vehicle 30, based on the image data indicating that the vehicle 30 at the window 28 has begun to move, that payment has been completed, or based on a button press by order fulfillment staff (e.g., that the order has been fulfilled and handed to the customer). The traffic control system 300 can operate the display screens 118 of the drive through units 108 to direct the vehicle 30 to the window 28 before the vehicle 30 currently at the window 28 has even left, since by the time the vehicle 30 at the drive through unit 108 pulls around to the window 28, the previous customer will have vacated the space in front of the window 28. Directing vehicles 30 at the drive through units 108 to begin traveling to the windows 28 slightly before vehicles 30 at the windows 28 have departed can advantageously improve throughput time of the drive through system 10.

The traffic control system 300 (e.g., the traffic manager 1040) can advantageously track how many and which of the windows 28 are in use, and track the use of the default window 28 (e.g., the second window 28b). Advantageously, keeping the middle window 28b free, having orderly flowing, or avoiding confusion of which window 28 the vehicles 30 should pull up to can improve throughput and efficiency of the drive through system 10 while enhancing orderly traffic flow and reducing potential vehicle interactions in the drive through system 10.

Figure 6:
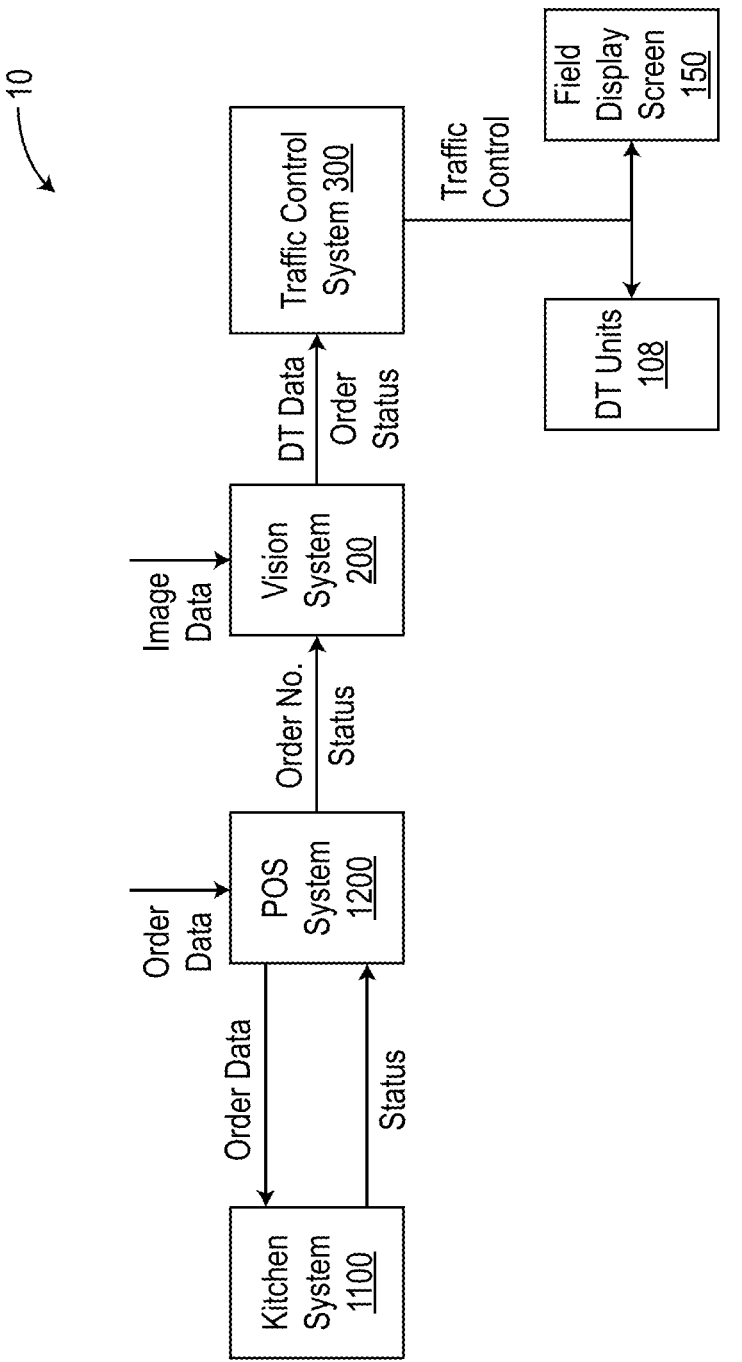
FIG. 6 is a diagram of system architecture for implementing the controller of FIG. 3 including a kitchen system, a point of sale system, a vision system, and a traffic control system, according to some embodiments.

Referring to FIGS. 4-6, the traffic control system 300 (e.g., the traffic manager 1040) can, responsive to selecting a window for each vehicle 30 to pull up to, provide the assigned or selected window 28 for the order number back to the POS system 1200 or the controller 102. The controller 102 or the POS system 1200 may operate the alert devices 904, the manager display screen 914, etc., or any other display screens viewable by staff of the store 14 to display the selected window 28 for the order number. The staff of the store 14 are thereby notified which window 28 to which to bring the order so that the customer seamlessly receives their order. Advantageously, the traffic control system 300 can provide feedback back through the drive through system 10 to the staff of the store 14 (e.g., to display screens of the kitchen system 1100) so that the staff of the store are notified which window 28 each order should be brought to.

Referring to FIGS. 4-6, the traffic control system 300 may also park vehicles 30 that have order modifications or desire changes to their order after receiving it (e.g., incorrect or missing items, etc.). The traffic control system 300 may receive an input from the staff that the customer is unhappy with their order or otherwise requires remedial action and can operate a display screen at the windows 28 to prompt the vehicle 30 to pull to a different window for remedial actions. In some embodiments, the traffic control system 300 uses inputs from a help button of the drive through units 108 or a field POS unit in order to direct the vehicle 30 to a window for remedial action. The traffic control system 300 (e.g., the traffic manager 1040) may use a default window for remedial action and hold the vehicles 30 at the drive through units 108 (if that is where the vehicles 30 are present when they request remedial actions) until the default window (e.g., the third window, window 28c) is available. Customers that are "parked" for remedial action can be taken out of the queue for incoming vehicles and orders. Similarly, the traffic control system 300 may account for vehicles 30 that pull up to the incorrect windows 28 (e.g., the traffic control system 300 prompts the vehicle 30 to pull up to the second window 28b but the vehicle 30 pulls up to the third window 28c). The traffic control system 300 may operate display screens at the windows 28 to reroute the vehicle 30 to the appropriate window 28, or may proceed and account for future traffic direction given the vehicle 30 pulling up to the window other than directed. The traffic control system 300 may also update notifications to the kitchen system 1100 or the staff in order to route the order drop off to the window 28 at which the vehicle 30 is actually present.

Referring to FIG. 6, the vision system manager 1030 and a traffic control system 300 can be provided as separate units or systems. In some embodiments, different restaurant customers may require different systems. For example, some may want the vision system 200 but not the traffic control system 300. Accordingly, the traffic control system 300 can be provided as a separate or modular unit that can be installed in the drive through system 10. The traffic control system 300 is configured to implement any of the functionality of the traffic manager 1040. The kitchen system 1100 is configured to receive order data from a POS system 1200 (e.g., the POS units 902 and the controller 102) in order to operate display screens in the kitchen to prompt preparation of the orders. The kitchen system 1100 may provide notifications to the POS system 1200 regarding the status of each order (e.g., which station in the kitchen that the order is currently at, notifications as the order is "bumped" to the next station, etc.). The POS system 1200 receives the order data from the POS units 902. The POS system 1200 may also assign order numbers to each set of order data which is provided to the kitchen system 1100. In this way, the kitchen system 1100 may provide statuses for each order number. The POS system 1200 provides the order number and status to the vision system 200. The vision system 200 is configured to implement any of the functionality of the vision system manager 1030. The vision system 200 is configured to communicate with the traffic control system 300 to provide the order status for each order number and various drive through data (e.g., identified characteristics of different vehicles, locations of different vehicles, stack size, etc., or any other parameter or data determined or obtained by the vision system 200) to the traffic control system 300. The traffic control system 300 is configured to use the drive through data from the vision system 200 and the order status for each order number in order to implement traffic control. In particular, the traffic control system 300 is configured to control the flow of traffic from the drive through units 108 to the windows 28 (e.g., notifying each customer when to pull ahead and which window 28 to pull to). The traffic control system 300 is also configured to control the flow of traffic from an entrance of the order lanes 20 to the drive through units 108 by operating the field display screen 150 if the drive through system 10 is equipped with the field display screen 150.

Figure 7:
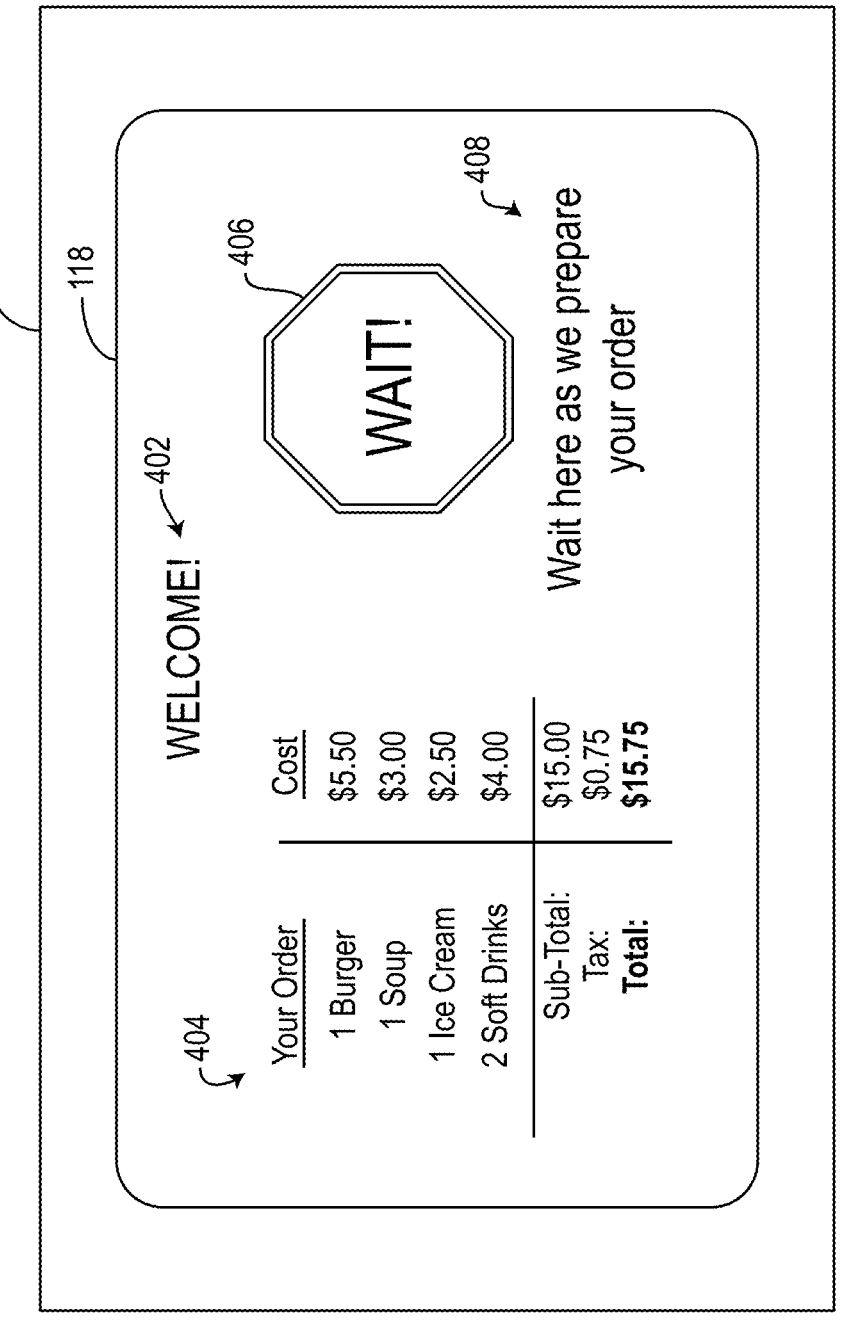
FIG. 7 is a depiction of a graphical user interface (GUI) that can be presented to a customer on a drive through unit in accordance with the traffic control system, according to some embodiments.
Figure 8:
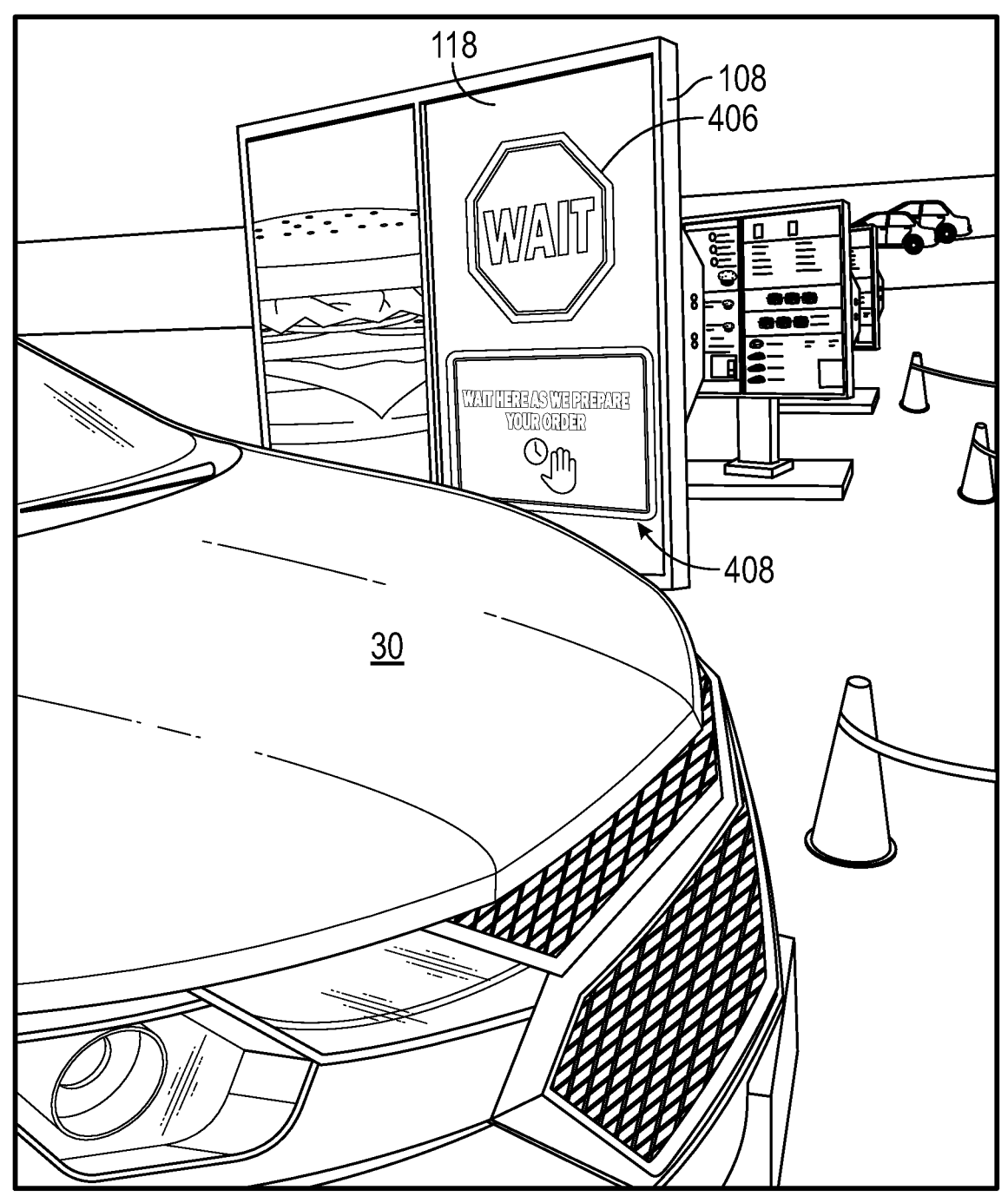
FIG. 8 is a depiction of a drive through unit displaying a GUI that can be presented in accordance with the traffic control system, according to some embodiments.
Figure 9:
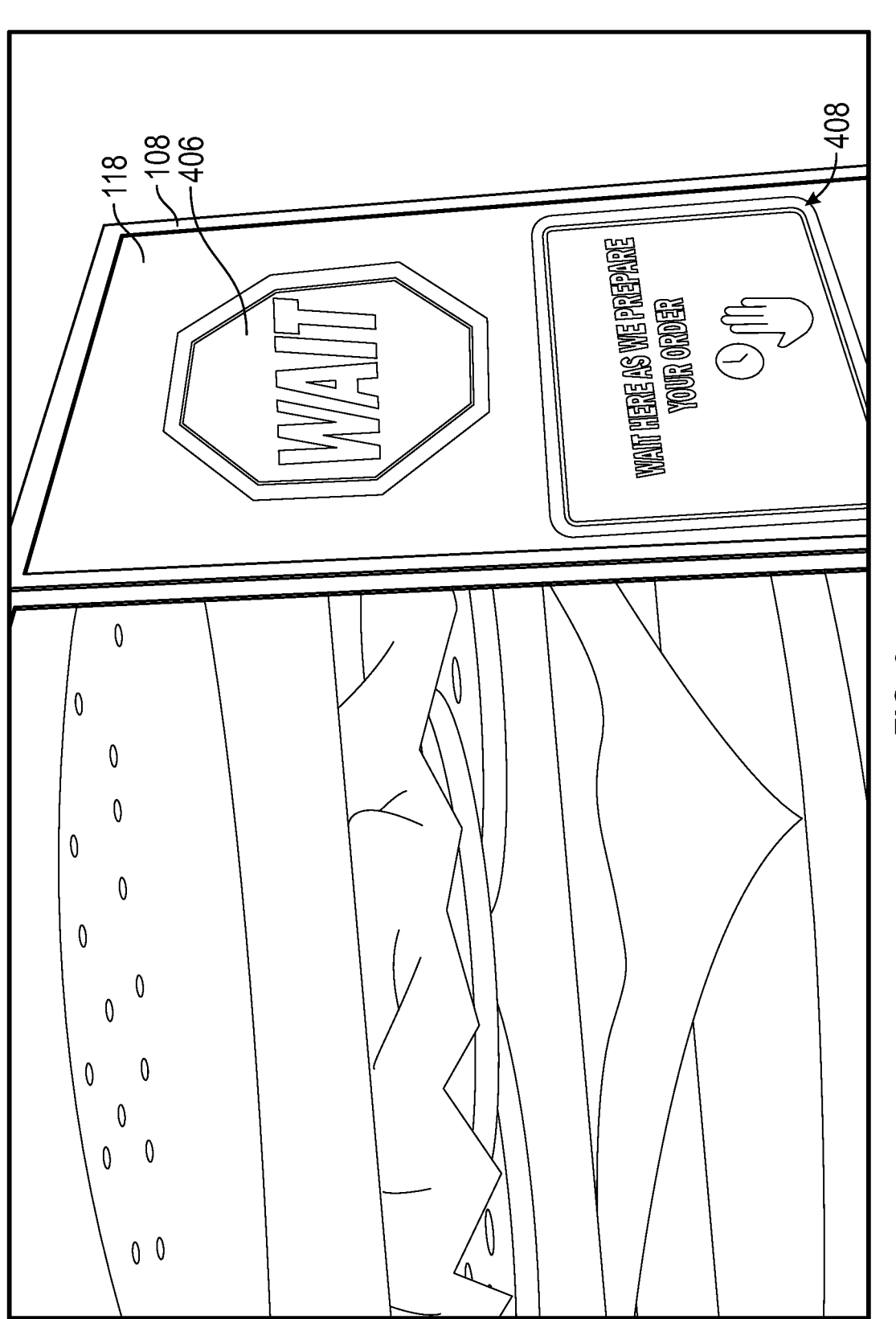
FIG. 9 is another depiction of the drive through unit of FIG. 8, according to some embodiments.

Referring to FIGS. 7-9, the traffic control system 300 may operate the display screen 118 of the drive through units 108 to provide welcome or greeting notifications 402, order information 404, a traffic control icon 406, and a traffic control notification 408. The traffic control icon 406 may have the form of a stop sign, a traffic light, etc., and provides a graphical representation of whether the customer at the drive through unit 108 should stay at the drive through unit 108 or travel to one of the windows 28. The traffic control notification 408 may include textual information informing the customer to "wait here as we prepare your order," for example. In some embodiments, the display screen 118 is configured to display a welcome message, previews and specials, etc., as advertisements when not in use (e.g., until the vision system 200 detects that a vehicle 30 has arrived at the drive through unit 108). Once a customer arrives at the drive through unit 108, the vision system 200 may notify the controller 102 (e.g., the order taking manager 1010), the POS system 1200, etc., that a customer has arrived at the drive through unit 108 such that an order taking process can be begun. The drive through unit 108 may include multiple different display screens 118 (e.g., 1 display screen, 2 display screens, 3 display screens, 4 display screens, etc.).

Figure 10:
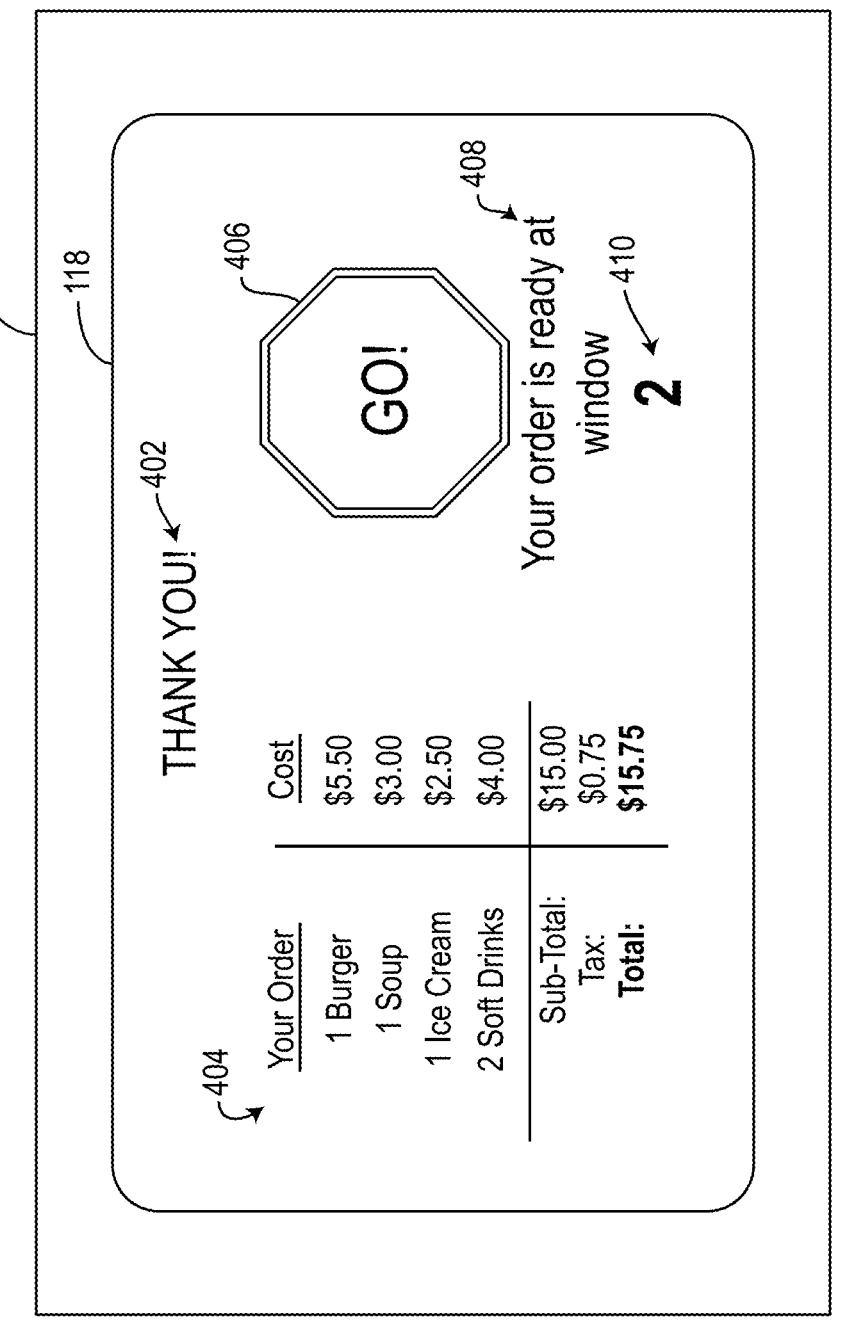
FIG. 10 is a depiction of a GUI that can be presented on a drive through unit in accordance with the traffic control system, according to some embodiments.
Figure 11:
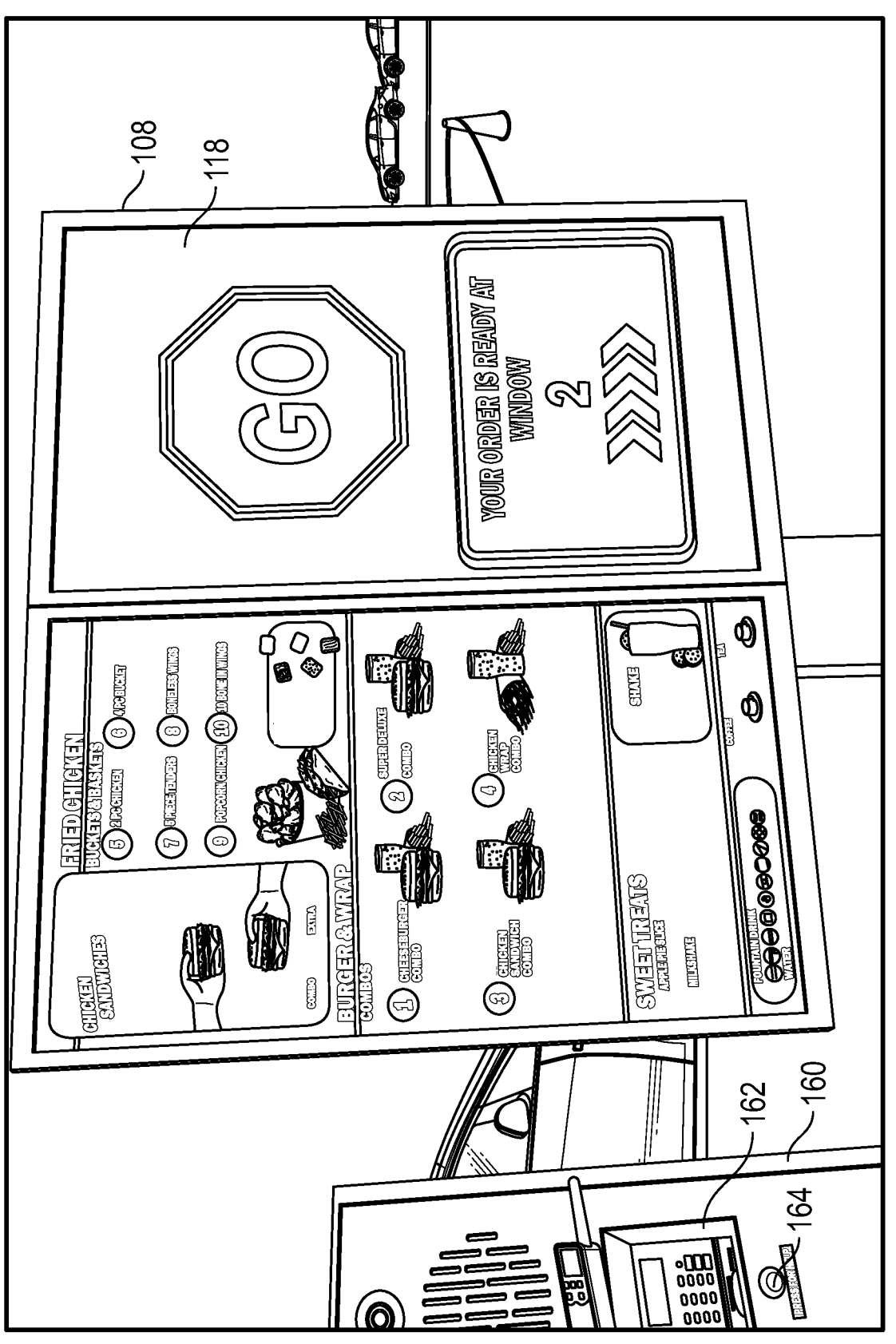
FIG. 11 is a depiction of the drive through unit of FIG. 8 displaying another GUI in accordance with the traffic control system, according to some embodiments.

Referring to FIGS. 10-11, the traffic control system 300 may operate the display screen 118 of the drive through units 108 to provide the greeting notifications 402, order information 404, traffic control icon 406, the traffic control notification 408, and a window notification 410. In particular, the user interface shown in FIGS. 10-11 of the traffic control system 300 indicates, via the traffic control icon 406, that the vehicle 30 should proceed to an order pickup window. The traffic control notification 408 may include textual information such as "your order is ready at window." The window notification 410 indicates which of the windows 28 that the vehicle 30 should pull up to retrieve the order to as determined by the traffic manager 1040 (e.g., the traffic control system 300). For example, FIGS. 10-11 illustrate that the customer's order is ready at window 2 (e.g., window 28b) and prompts the vehicle 30 to pull up to the second window for order retrieval. The windows 28 can include visual signs, screens, or identifiers corresponding to the window notification 410. In some embodiments, the window notification 410 is a numerical value (e.g., "1," "2," or "3") and the windows 28 each include signage, a display screen, etc., that provides a visual indication of the numerical value. In some embodiments, the window notification 410 also includes a corresponding shape, geometric indication, color, or icon unique to each of the windows 28. For example, the window notification 410 for the first window 28a may have the form of a yellow triangle with the number "1" inside the yellow triangle, the window notification 410 for the second window 28b may have the form of a green square with the number "2" inside the green square, and the third window 28c may have the form of a blue circle with the number "3" inside of the blue circle. It should be understood that this description is illustrative only and should not be understood at limiting. The windows 28 may each have posted signage or display screens with visual representations corresponding to the window notifications 410. Advantageously, providing a graphical icon alongside a numerical number or a character (e.g., window "A," window "B," or window "C") facilitates improved perceptibility of the traffic control displays provided to the customers in the vehicles 30 and facilitates ensuring the customers go to the correct windows 28.

Referring particularly to FIG. 11, the drive through system 10 may include field POS units 160 positioned proximate the drive through units 108 to allow the customer to pay at the drive through unit 108. The field POS unit 160 may include a payment device 162 (e.g., a card reading device), and a help button 164. When the help button 164 is depressed, the staff of the restaurant 14 are notified (e.g., via the communications system 100) that the customer requires help (e.g., in paying). In some embodiments, the order taking staff stay online with the customer via the drive through unit 108 to communicate with the customer and add items to the customer's order until it comes time to pay. Then, depending on whether the field POS unit 160 is provided, the customer may pay at the field POS unit 160 (which can be integrated onto the drive through unit 108) or may wait to pay at the windows 28. The POS unit 160 may accept wallet or card payment, or any other digital payment modality. The help button 164 may also be pressed if a customer has had an issue with their order and is returning through the drive through system 10 to remedy an incorrect order. The help button 164 can also be pressed if the customer has been waiting at the drive through unit 108 in order to notify staff that the customer is currently waiting to place an order. It should be understood that, while the drive through system 10 described herein uses multiple display screens (e.g., the display screens 118 of the drive through units 108), there can be a practical limit on how many light emitting diodes or light emittance the drive through system 10 can include (e.g., light restrictions). The drive through system 10 is configured to comply with any light restrictions, according to some embodiments.

Referring to FIG. 12, a flow diagram of a process 1300 for controlling traffic in a drive through includes steps 1302-1316, according to some embodiments. The process 1300 can be performed by the drive through system 10, or more specifically, by a POS system, a vision system (e.g., the vision system 200), a kitchen system (e.g., the kitchen system 1100), and a traffic control system (e.g., the traffic control system 300).

The process 1300 includes obtaining image data of a drive through (step 1302), according to some embodiments. The image data can be obtained by the vision system 200 (e.g., by a controller of the vision system 200 or the controller 102) from cameras 114 of the vision system 200. The image data can be image data of different areas, lanes, entry lanes, order lanes, pickup spots, pickup windows, etc., of the drive through.

The process 1300 includes detecting vehicles in the drive through (step 1304), according to some embodiments. In some embodiments, step 1304 is performed by the vision system 200, or more specifically, by the vision system manager 1030 implemented on processing circuitry 1002. Step 1304 may include identifying characteristics of the vehicles in the drive through such as type, size, color, etc. Step 1304 also includes identifying a location of the vehicles in the drive through, according to some embodiments. In some embodiments, step 1304 is performed using multiple predetermined zones or geometric shapes throughout the drive through in a virtual or computer environment. Step 1304 includes identifying a type of vehicle, a color of vehicle, etc., and a corresponding location of the vehicle in the drive through (e.g., whether the vehicle is at an order location, whether the vehicle is at a specific window, etc.). Step 1304 is performed by implementing an image analysis or artificial intelligence technique using real-time image data, according to some embodiments.

The process 1300 includes determining which of multiple order locations an incoming vehicle should be routed to (step 1306) and operating a display screen to route the incoming vehicle to an identified order location (step 1308), according to some embodiments. Step 1306 can be optional depending on whether the drive through has a field display screen positioned proximate an entrance of multiple order lanes (e.g., an entrance to the order lanes 20). Step 1306 includes determining, based on a presence of other vehicles 30 in the order lanes 20, which of the order lanes 20 has an available drive through unit 108 (e.g., an available menu board). In some environments, it can be difficult for customers to view around corners when entering the order lanes 20 which may result in the customer entering an order lane which already has another customer at the drive through unit 108 while an adjacent order lane does not have any customer at the drive through unit 108. Advantageously, the display screen can be positioned proximate the entrance to the multiple order lanes 20 such that the traffic control system directs incoming vehicles to order lanes 20 having available drive through units 108. The display screen can be the field display screen 150. In some embodiments, step 1306 is not performed and step 1308 includes operating the display screen to provide an overall graphical user interface (GUI) of the vehicles 30 in the drive through. For example, based on the vision system results, the overall GUI can include, but is not limited to, icons of all the vehicles 30 currently in the drive through, their respective locations in the drive through, and type and color of the vehicles, or any combination thereof. The overall GUI can be updated in real-time based on live image data obtained from the cameras 114. In this way, when the customer approaches the order lanes 20, the customer may view which order lanes already have customers at the drive through units 108 and drive into an order lane that has an available drive through unit 108 for ordering, even if the customer cannot see directly into the order lanes.

The process 1300 includes obtaining point of sale data as a result of taking an order for the incoming vehicle (step 1310), according to some embodiments. In some embodiments, step 1310 is performed when staff of the store or restaurant takes the customer's order and enters the order information via a POS unit (e.g., POS units 902) which is then provided to the traffic control system 300 via the vision system 200. The point of sale data can also include an order number, or multiple order numbers associated with the vehicles 30 at the different drive through units 108. For example, if a customer in the vehicle 30 has a mobile order, but then decides to purchase additional items in a separate order, step 1310 can include obtaining two order numbers for the vehicle 30, and tagging both of the order numbers to the vehicle 30. Likewise, if multiple occupants are in the vehicle 30 and each order separately, any number of order numbers can be tagged to the vehicle 30.

The process 1300 includes operating a display screen at the order location to prompt the incoming vehicle to stay at the order location until ready (step 1312), according to some embodiments. In some embodiments, step 1312 is continually performed until the order numbers associated with the vehicle at the order location are ready. Step 1312 is performed by the traffic control system 300 until the traffic control system 300 obtains order status indications (e.g., from the vision system 200, the POS system 1200, and the kitchen system 1100) that the order numbers associated with the vehicle at the order location are ready. In some embodiments, step 1312 includes operating the display screen 118 of the drive through unit 108 at which the vehicle 30 is positioned to provide a visual notification (e.g., a user interface, visual content, audible content, etc.) to stay at the drive through unit 108. The visual content can include the presentation of a stop sign, a textual command to stay at the drive through unit 108, etc. The audible content can include operating the speakers 120 of the drive through unit 108 to provide spoken feedback to the vehicle 30 instructing the customer to stay waiting at the drive through unit 108. In some embodiments, step 1312 includes providing both visual content and audible content to the customer at the drive through unit 108. Step 1312 can also include providing the overall GUI optionally presented in step 1308 on the display screen 118 of the drive through unit 108, or on a separate display screen proximate the drive through unit 108. Step 1312 can also include providing a real-time camera feed of cameras 114 positioned proximate the pickup windows 28. Providing the overall GUI can provide an indication to the customer that the windows 28 are currently occupied by other customers and therefore prompt the customer at the drive through unit 108 to remain at the drive through unit 108 until directed to a window 28.

The process 1300 includes determining, based on the point of sale data, kitchen data, and the image data, which of multiple windows to route the incoming vehicle to (step 1314) and, responsive to the order for the incoming vehicle being ready, operating the display screen at the order location to route the incoming vehicle to the determined window (step 1316), according to some embodiments. In some embodiments, step 1314 is performed by the traffic control system 300 based on the order numbers associated with the vehicle 30 and the reported status from the kitchen system 1100. Once all of the order numbers associated with the vehicle 30 indicate that the orders have been prepared (e.g., have moved to a staging area or an assembly station), the traffic control system 300 proceeds to determining which of the windows 28 the vehicle 30 should be directed to. Step 1314 can include identifying which of the windows 28 are currently open, and based on a size of the vehicle 30, routing the vehicle 30 to a selected window 28 or holding the vehicle 30 until windows 28 open. Once the traffic control system 300 identifies a window to route the vehicle 30 to, the traffic control system 300 operates the display screen 118 of the drive through unit 108 to notify the customer in the vehicle 30 to pull ahead to the identified window.

Figure 13:
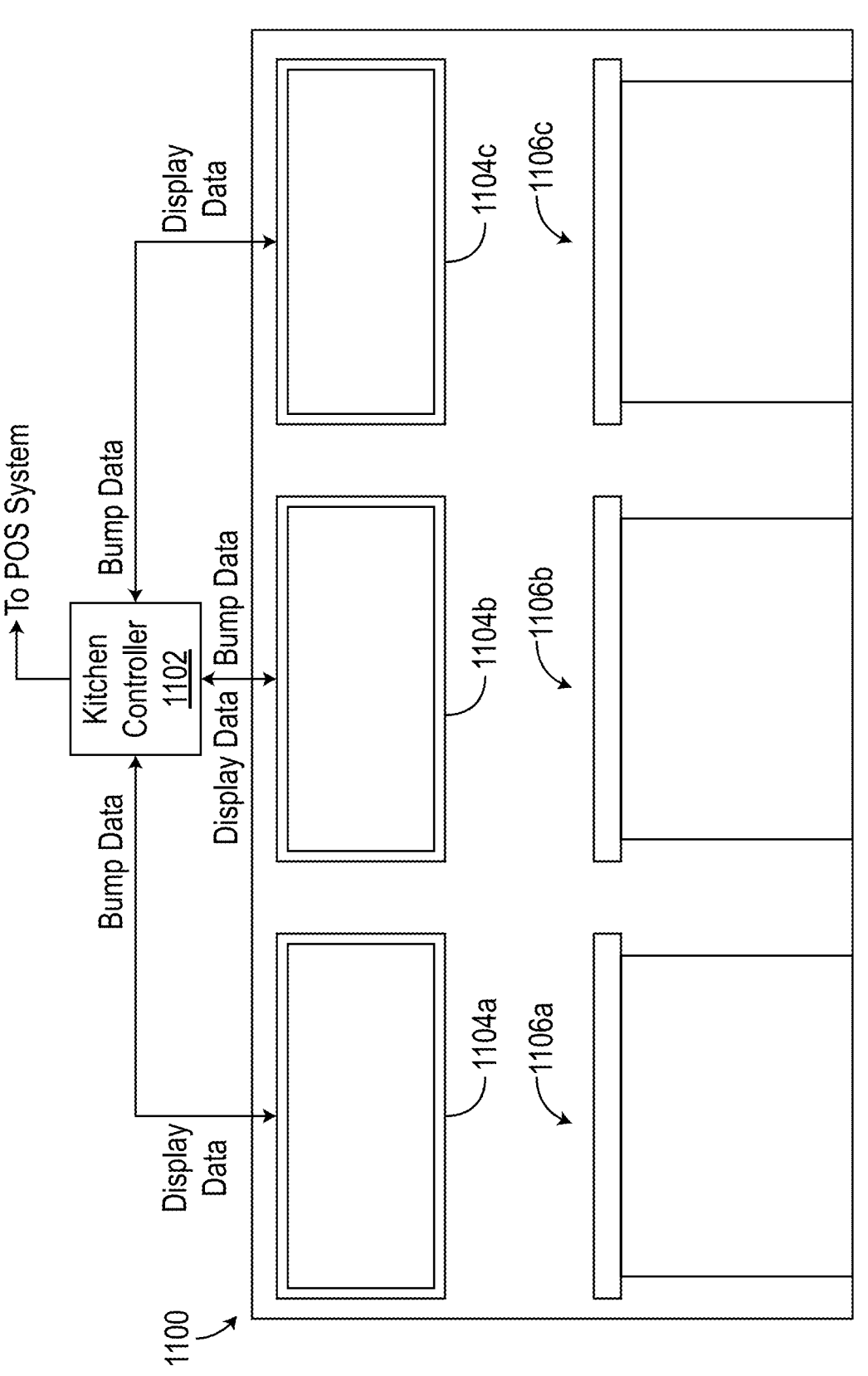
FIG. 13 is a depiction of a kitchen system, according to some embodiments.

Referring to FIG. 13, the kitchen system 1100 includes a kitchen controller 1102, multiple kitchen stations 1106, and multiple kitchen screens 1104. The kitchen screens 1104 are configured to display order data and an order number obtained by the kitchen controller 1102 from the POS system 1200. The kitchen screens 1104 may prompt different kitchen staff to prepare the various food items or beverage items for corresponding orders. For example, the kitchen station 1106a can be a beverage station or staging area, the kitchen station 1106b can be a food preparation area, and the kitchen station 1106c can be an expeditor station or assembly area. The staff may prepare the food items and the beverage items at the kitchen stations 1106a and 1106b as indicated by the order data displayed on the kitchen screens 1104a and 1104b. Once the food and beverage items are completed, the kitchen staff may "bump" or place the food and beverage items at the assembly area (e.g., the kitchen station 1106c). In some embodiments, the kitchen staff provide an input to the kitchen controller 1102 once they have completed their beverage or food item preparation (e.g., by pressing a button). Once the food and beverage items are placed at the kitchen station 1106c, a kitchen staff may assemble the order, and once the order is assembled, provide an input to the kitchen controller 1102 (e.g., via the display screen 1104c if the display screen 1104c is a touch screen, or via a button or keypad) that the order has been prepared. Once the kitchen controller 1102 receives an indication from the kitchen station 1104c that the order has been prepared (e.g., the "bump data"), the kitchen controller 1102 may notify the POS system 1200, the vision system 200, or the traffic control system 300 that the order is fully prepared (e.g., that the corresponding order number is ready to be picked up by the corresponding customer or vehicle 30). The order number and status received by the vision system 200 as described in greater detail above with reference to FIGS. 5 and 6 is the notification from the kitchen station 1106c for the order number, or a notification that all of the food and beverage items have arrived at the kitchen station 1106c. The completion of required tasks at each of the kitchen stations 1106 can be "bumped" or prompted individually (e.g., a bump indicating that the required tasks at the beverage station 1106a have been completed, a bump indicating that the required tasks at the food station 1106b have been completed, and a separate bump indicating that the required tasks at the kitchen station 1106c have been completed) or can be bumped all at once after the order is completely prepared. The traffic manager 1040 or the traffic control system 300 may receive the bumps or indications of completion of the required tasks to prepare the order in real-time so that the traffic manager 1040 can direct the customers to the appropriate windows 28 once the order is fully prepared.

In some embodiments, the kitchen controller 1102 is configured to receive an indication of a customer wait time for each order that is being prepared in the kitchen. The customer wait time can be provided by the POS system 1200 based on image data from the vision system 200. The customer wait time may indicate a total amount of elapsed time that the customer has been waiting at the drive through unit 108 for their order(s). The kitchen screens 1104 are configured to display an indication to kitchen staff or personnel regarding the customer wait time relative to a target customer wait time. The kitchen screens 1104 may display a running timer next to each order (e.g., each order number) indicating the customer wait time. In some embodiments, a display color of the customer wait time changes as the customer wait time changes with respect to the target customer wait time. For example, if the target customer wait time is 1 minute or less, the customer wait time displayed on the kitchen screens 1104 may blink in a first color as the customer wait time approaches the target customer wait time. As the customer wait time approaches 2 minutes, or another threshold above the target customer wait time, the customer wait time displayed on the kitchen screens 1104 may blink in a second color. In some embodiments, the target customer wait time is determined for specifics of the order and accounts for complexity and expected length of time to prepare the orders.

Figure 14:
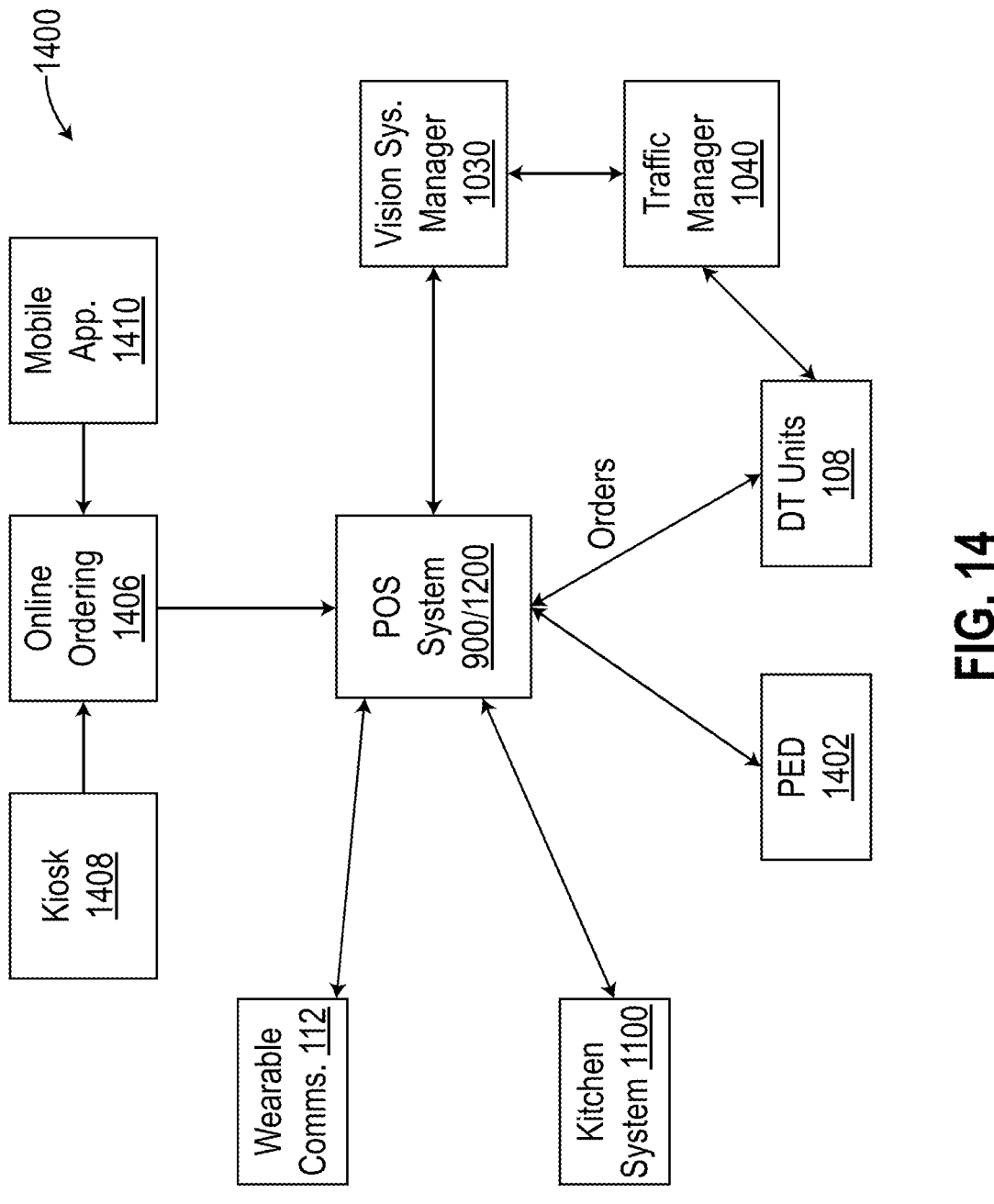
FIG. 14 is a depiction of system architecture of the drive through system of FIG. 1, according to some embodiments.

Referring to FIG. 14, a diagram 1400 illustrates an overall system architecture of the drive through system 10. The diagram 1400 illustrates the POS system 900 (e.g., the POS system 1200) that integrates an online ordering system 1406, the wearable communications devices 112, the kitchen system 1100, a PED 1402, the drive through units 108, the traffic manager 1040 (e.g., the traffic control system 300), and the vision system manager 1030. The POS system 900 is configured to receive online orders from the online ordering system 1406 that originate at either a kiosk 1408 (e.g., an in-store kiosk, a remote kiosk, etc.) or from a mobile application 1410 on a customer's smartphone. The POS system 900 also receives communications from the wearable communications devices 112, and communicates with the vision system manager 1030. The POS system 900 can communicate with the traffic manager 1040 through the vision system manager 1030 (e.g., to provide order numbers and order statuses). The POS system 900 may obtain status information from the kitchen system 1100 and provide the order statuses for different order numbers to the vision system manager 1030 which are provided to the traffic manager 1040 for directing traffic. In some embodiments, the POS system 900 is configured to receive order information from the drive through units 108. The drive through system 10 can operate in a mode where the vision system manager 1030 and the traffic manager 1040 are inactivated and the POS system 900 operates with the drive through units 108 and the wearable communications devices 112 (e.g., in a reduced mode). Order confirmation can be transferred from the drive through unit 108 to the traffic manager 1040 by the POS system 900. The drive through units 108 can be implemented as digital menu boards (DMB) using omni-channel ordering (OCU).

In some embodiments, the traffic manager 1040 is optional. For example, the traffic manager 1040 can be installed as an additional system as desired by the owner of the store 14. The traffic manager 1040 can be installed and used if multiple order lanes 20 (e.g., 3 or more) are used at the store 14. If the store 14 only has two or three order lanes 20, the vision system manager 1030 may operate without requiring the traffic manager 1040.

Vision System Configuration and Implementation

Figure 15:
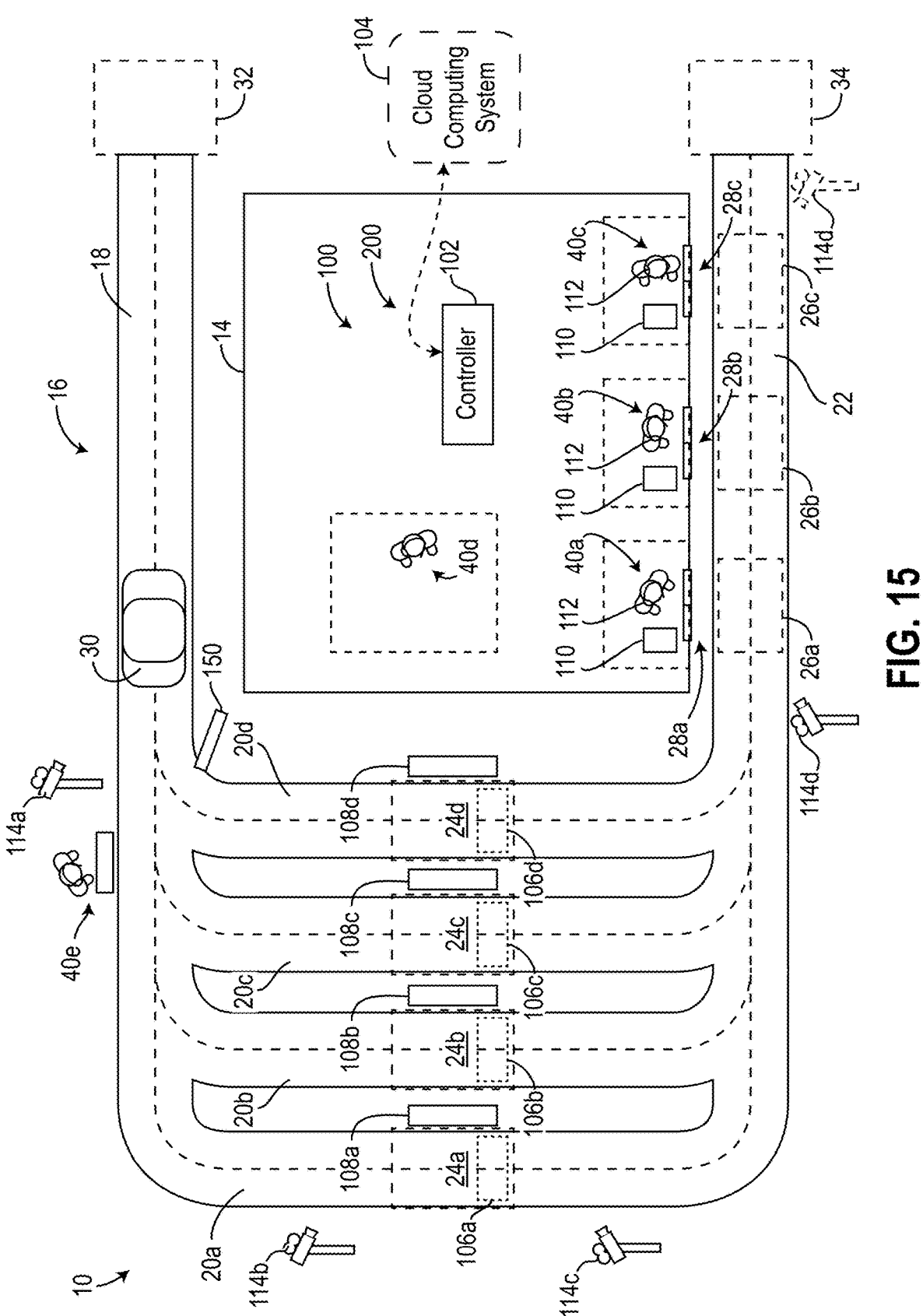
FIG. 15 is a depiction of the drive through system of FIG. 1 indicating specific positioning of cameras for the vision system, according to some embodiments.

Referring to FIGS. 15, the drive through system 10 may include four cameras 114, shown as first camera 114a, second camera 114b, third camera 114c, and fourth camera 114d. The first camera 114a can be positioned at the entry lane 18 and is configured to obtain image data of vehicles 30 entering the drive through system 10. The first camera 114a can be positioned at a straight portion of the entry lane 18 or along a curve to the entries to the order lanes 20. The second camera 114b is positioned proximate the drive through units 108 from a rear and is configured to obtain image data of vehicles 30 at the drive through units 108 from the rear. The third camera 114c is positioned proximate the drive through units 108 (e.g., the digital menu boards) and is configured to obtain image data of the vehicles 30 at the drive through units 108 from the front. The fourth camera 114d is positioned along the pickup lane 22 and is configured to obtain image data of the windows 28 and pickup zones 26a, 26b, and 26c in front of each of the windows 28. The fourth camera 114d can be positioned to obtain image data from a rear of the vehicles 30 at the windows 28, or alternatively, from a front of the vehicles 30 as shown in FIG. 15. The drive through system 10 includes multiple points of customer interaction including the drive through units 108, and the windows 28, according to some embodiments. In some embodiments, the drive through system 10 includes an additional entry point, such as a greeting station 40e at an entrance to the drive through system 10 where the greeting station 40e may direct traffic according to recommendations provided by the traffic control system 300.

Referring to FIGS. 4 and 15, the image analysis 1014 can be configured to be trained based on inclement weather such as snow, rain, etc. The vision system manager 1030 is configured to use feedback from the drive through units 108 (e.g., order taking activity, identification of spoken words or phrases by the microphones 122 of the drive through units 108, etc.) in order to identify that a vehicle is within the image data of the second camera 114b and the third camera 114c. The vision system manager 1030 may use the feedback from the drive through units 108 in order to train or tune the image analysis 1014 to detect vehicles 30 in the image data even if weather conditions obscure the identification of vehicles 30. Training the image analysis 1014 based on image data obtained during inclement weather when it is known that a vehicle 30 is present (based on activity at the drive through unit 108) improves the accuracy of the image analysis 1014 and allows the vision system manager 1030 to improve. The vision system 1030 may use edge detection, headlights, windshield outlines, etc., to detect the vehicles 30.

Figure 16:
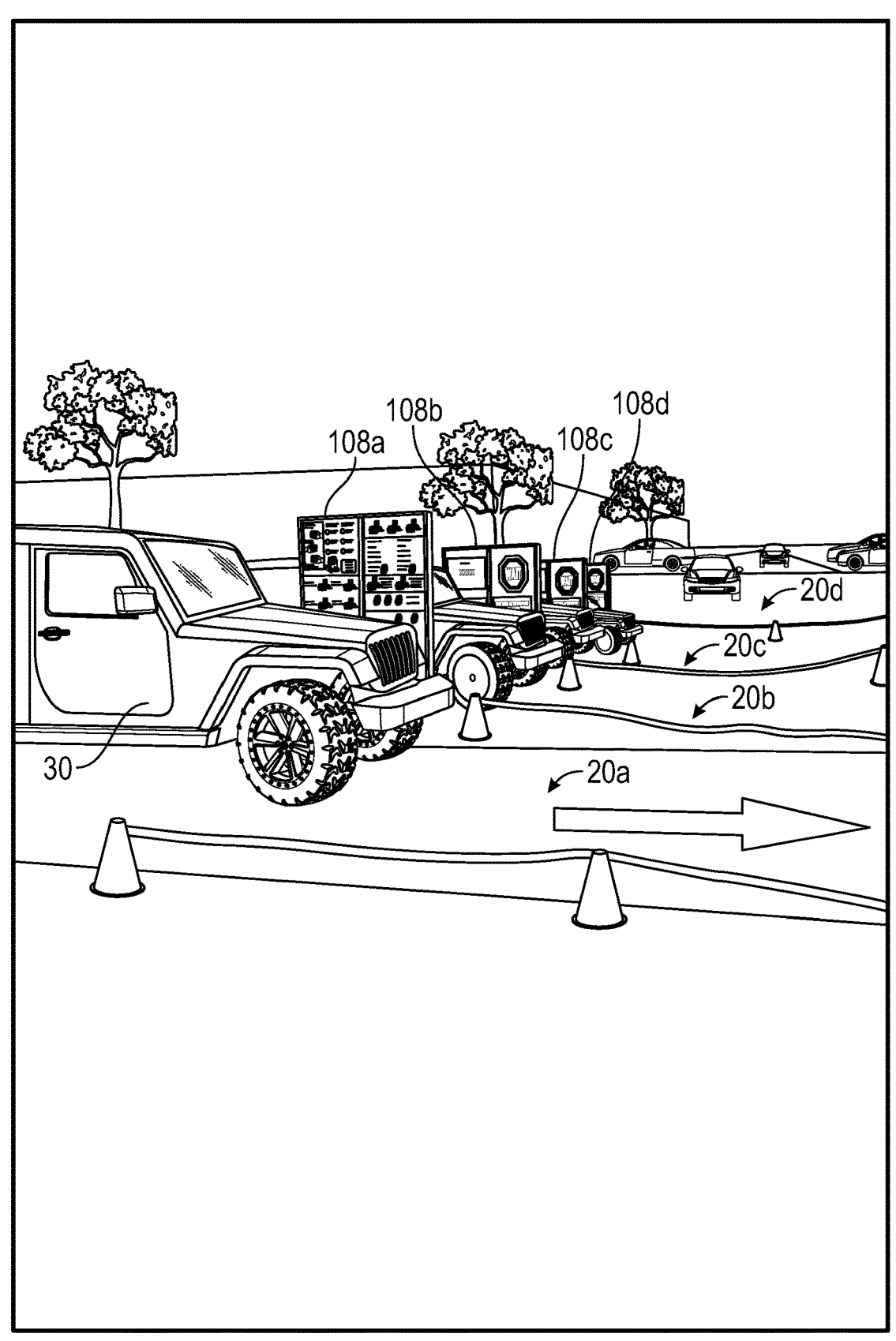
FIG. 16 depicts multiple order lanes and drive through units of the drive through of FIG. 1, according to some embodiments.

Referring to FIG. 16, the second camera 114b and the third camera 114c are configured to obtain image data of the vehicles 30 at each of the order lanes 20a, 20b, 20c, and 20d. The order lanes 20 include corresponding drive through units 108 at which the customers in the vehicles 30 may place their orders.

Figure 17:
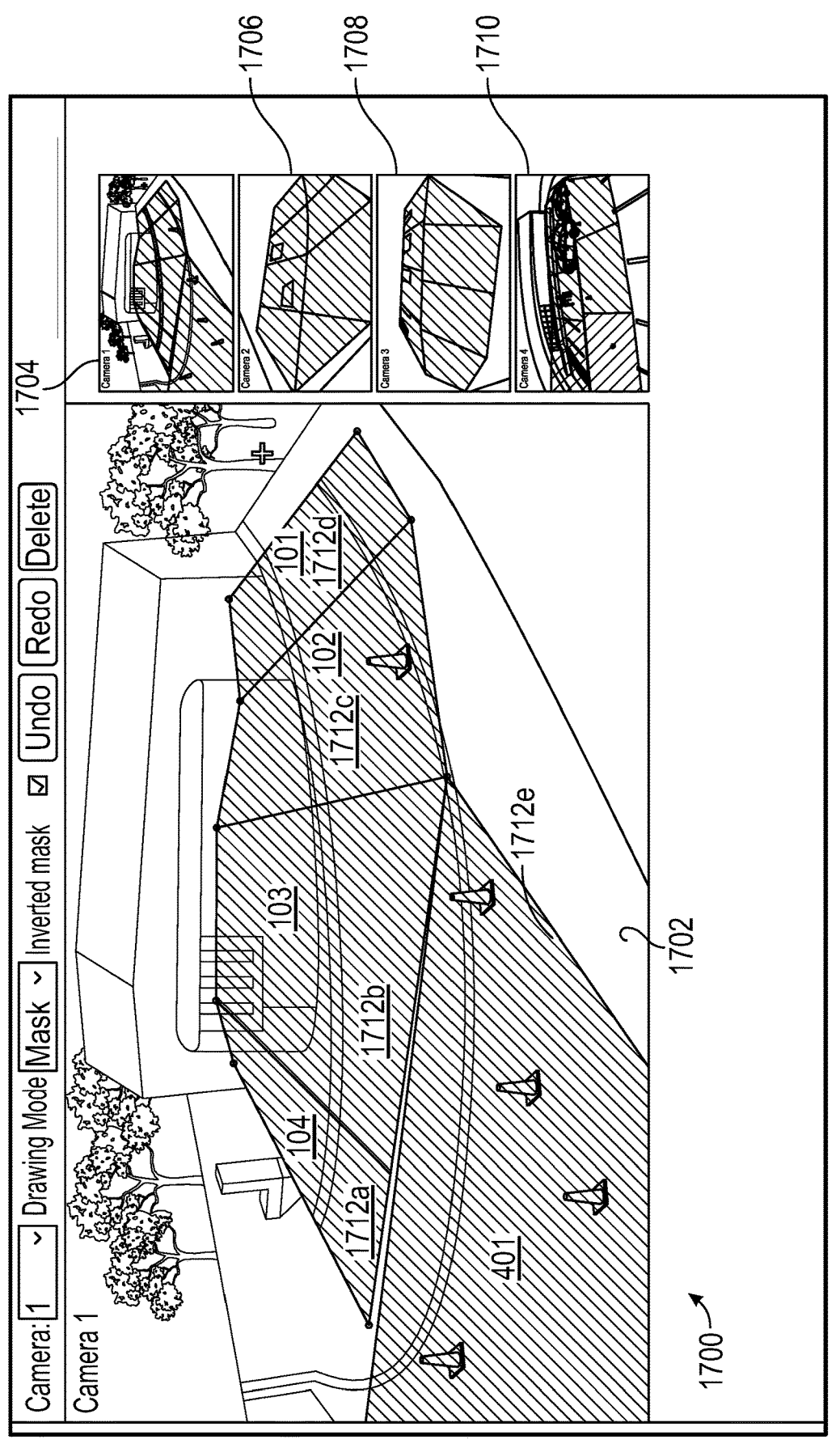
FIG. 17 is an interface showing image data from different cameras of a vision system of a drive through including masked image data and defined zones, according to some embodiments.

Referring to FIG. 17, an interface 1700 illustrates a viewport that shows the image data from the first camera 114a, the second camera 114b, the third camera 114c, and the fourth camera 114d. The interface 1700 includes a display window 1702 that displays the image data obtained from one of the camera 114, and corresponding zones 1712 for the camera 114. The vision system 200 may use site specific layouts and definitions of the zones 1712. During setup of the zones 1712, a snapshot is taken at the camera 114, areas that are undesired are masked out, and zones 1712 are defined. The zones 1712 can be linked to each other. Specifically, adjacent zones 1712 are linked to each other so that a vehicle 30 can be tracked as it travels through different zones 1712. In the example shown in FIG. 17, a first zone 1712a is linked with a second zone 1712b, which is linked with a third zone 1712c, which is linked with a fourth zone 1712d. The example shown in FIG. 17 also includes a fourth zone 1712e. The interface 1700 includes side panes 1704, 1706, 1708, and 1710 that can be selected to adjust display of the image data from the first camera 114a, the second camera 114b, the third camera 114c, or the fourth camera 114d on the display window 1702. The zones 1712 may also be assigned textual coordinates or identifiers (e.g., zone 104, zone 103, zone 102, etc.). The number of zones can differ. Regardless of the number of zones defined, a subsequent zone is linked to a previous zone such that the continuity of zones throughout the drive through is preserved. The zones 1712 between cameras 114 can be linked to each other if the cameras 114 obtain image data of a same area from different perspectives.

Figure 18:
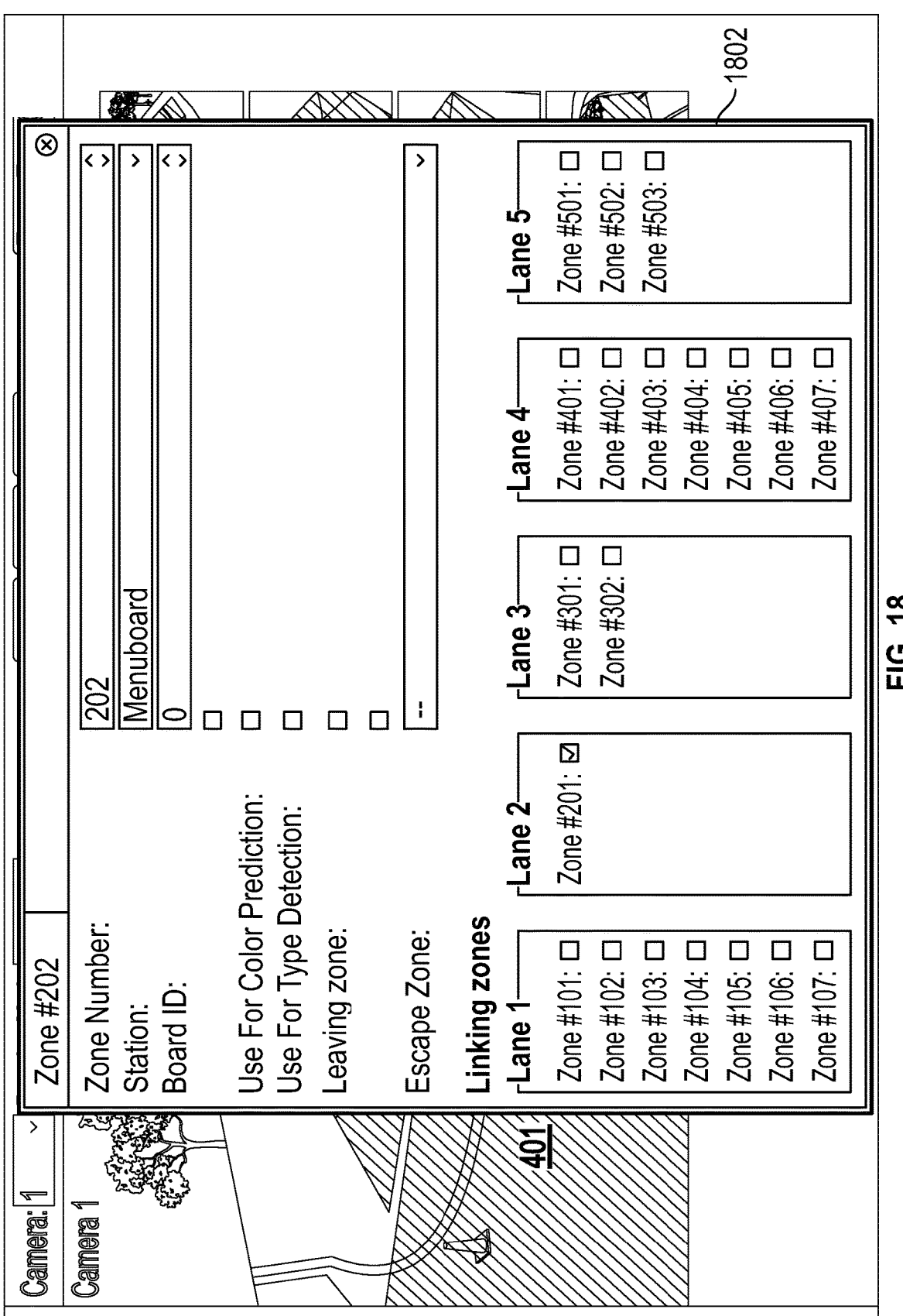
FIG. 18 is a window illustrating links between zones for the image data of FIG. 17, according to some embodiments.

Referring to FIG. 18, a window 1802 illustrates different characteristics of zone of the second camera 114b. For example, as shown in FIG. 18, the zone number 202 is linked to zone 201 in the second order lane 20b. The zone 202 is the zone proximate the drive through unit 108b at the second order lane 20b such that when a vehicle 30 is detected at the zone 202, the vision system 200 determines that the vehicle 30 is ordering or awaiting direction to one of the windows 28.

Figure 19:
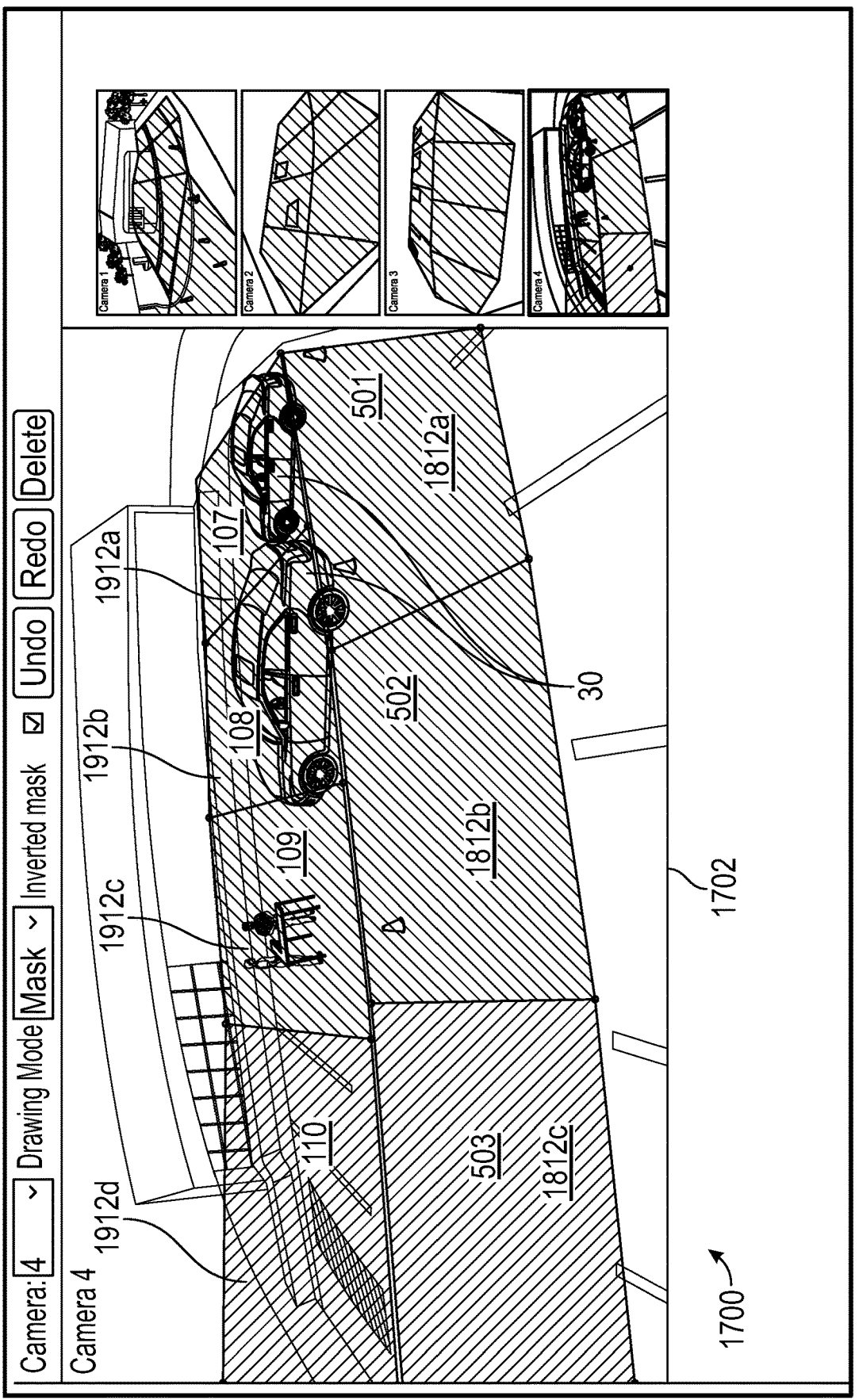
FIG. 19 is another interface showing image data from a camera of the vision system of the drive through including masked image data and defined zones, according to some embodiments.
Figure 20:
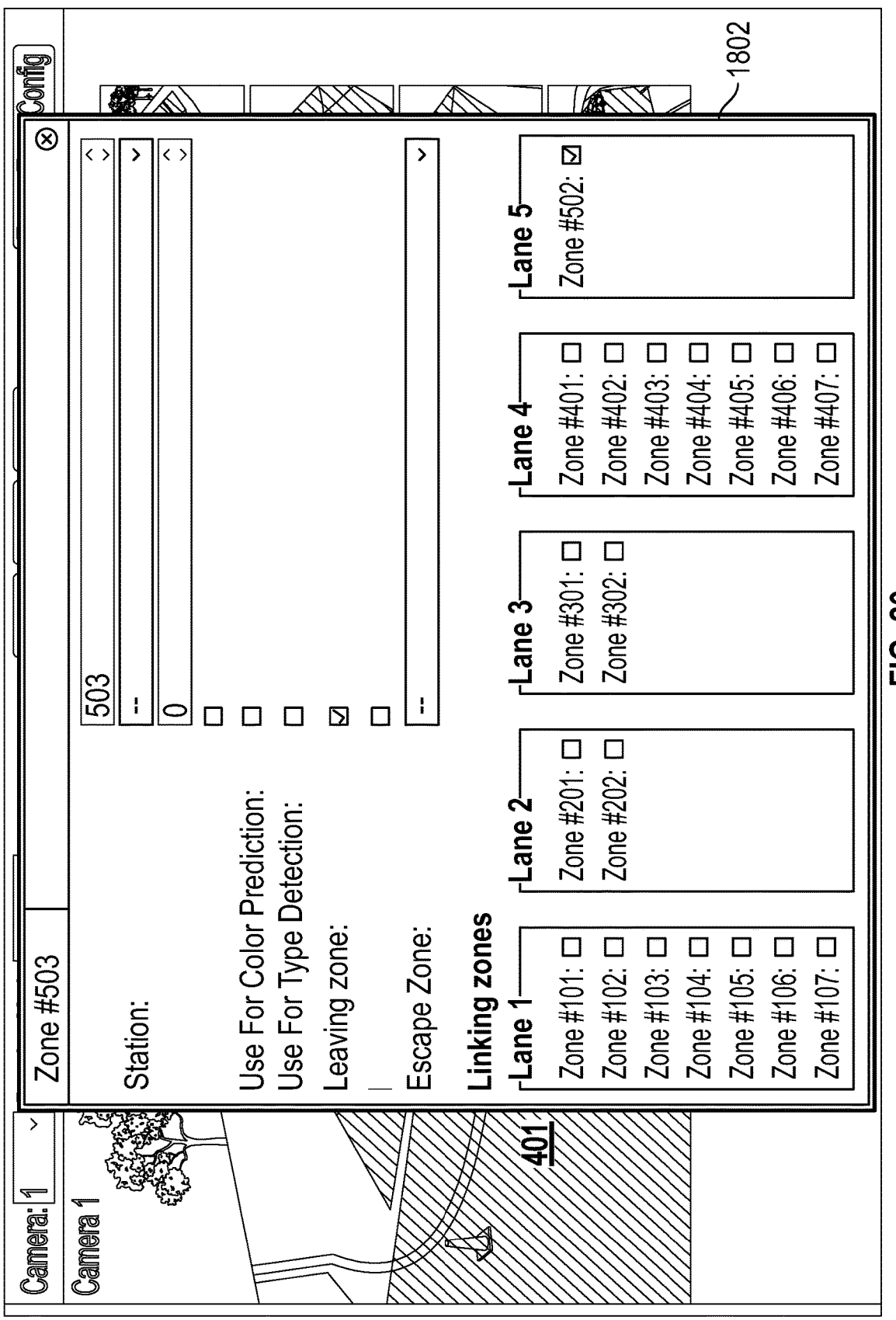
FIG. 20 is window illustrating links between zones for the image data of FIG. 19, according to some embodiments.

Referring to FIG. 19, the user interface 1700 is shown displaying image data from the fourth camera 114d in the display window 1702. The image data of the fourth camera 114*d* includes zones for different pickup lanes, shown as zones 1812*a*, 1812*b*, and 1812*c* for a first pickup lane, and zones 1912*a*, 1912*b*, 1912*c*, and 1912*d* for a second pickup lane. As shown in FIG. 20, the zone 1812*c* of the first pickup lane is linked with the zone 1812*b* of the pickup lane (the adjacent zone).

User Interfaces

Figure 21:
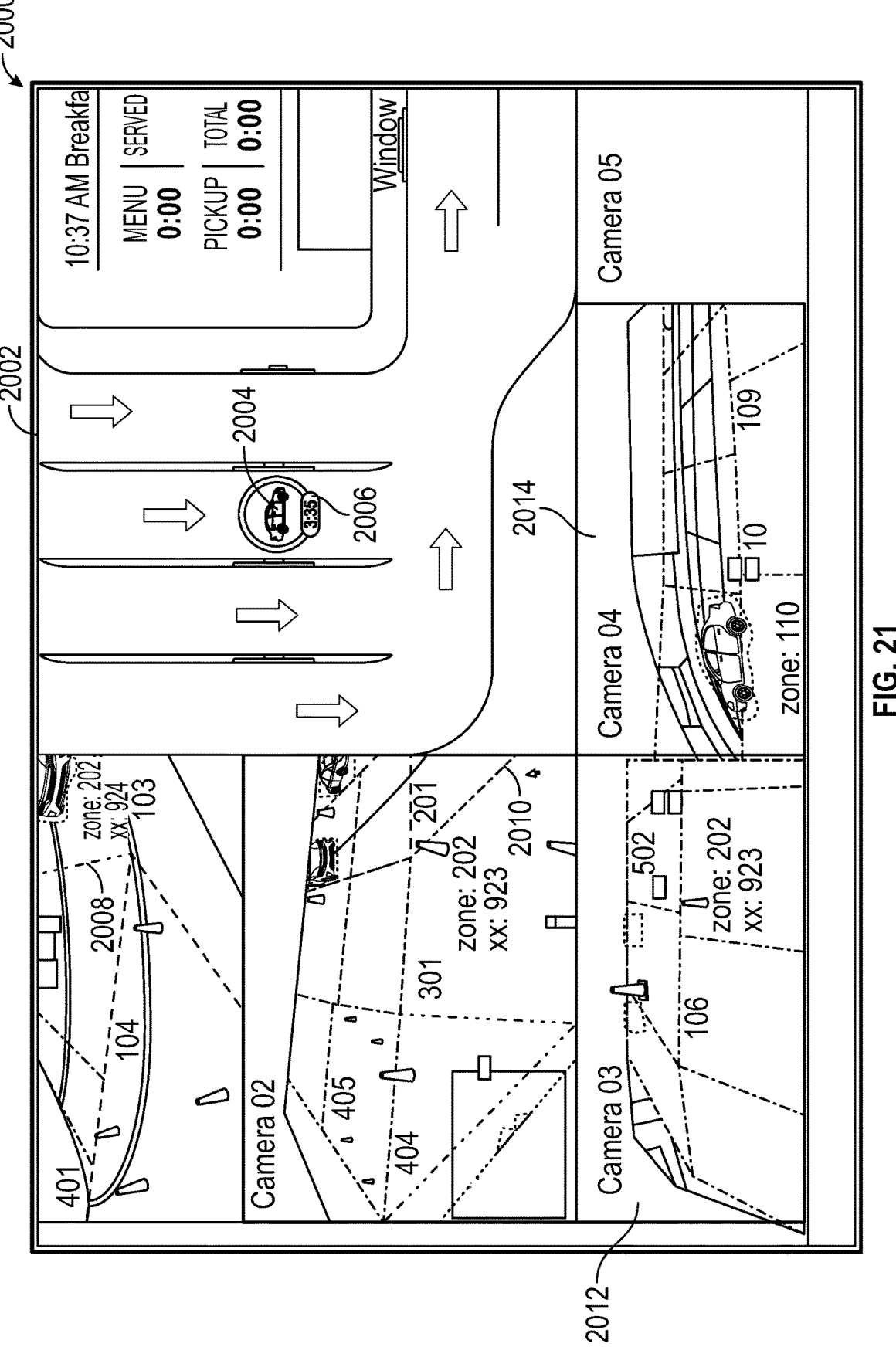
FIG. 21 is a user interface showing image data from the cameras of the vision system of FIG. 1 and vehicle icons on a graphical representation of the drive through system, according to some embodiments.

Referring to FIG. 21, a user interface 2000 includes a traffic GUI 2002, and live views of the image data obtained by the cameras 114. The traffic GUI 2002 includes a map of the drive through system 10, and vehicle icons 2004 that indicate a location of vehicles in the drive through system (e.g., proximate one of the drive through units 108). The traffic GUI 2002 may also display an order number associated with the vehicles 30 or a total wait time 2006 as shown in FIG. 21. The user interface 2000 includes a first window 2008 that displays image data from the first camera 114*a*, a second window 2010 that displays image data from the second camera 114*b*, a third window 2012 that displays image data from the third camera 114*c*, and a fourth window 2014 that displays image data from the fourth camera 114*d*. The user interface 2000 can be displayed on the alert devices 904, the manager display 914, the field display screen 150, the drive through units 108, the pickup alert device 908, the POS units 902, etc.

Figure 22:
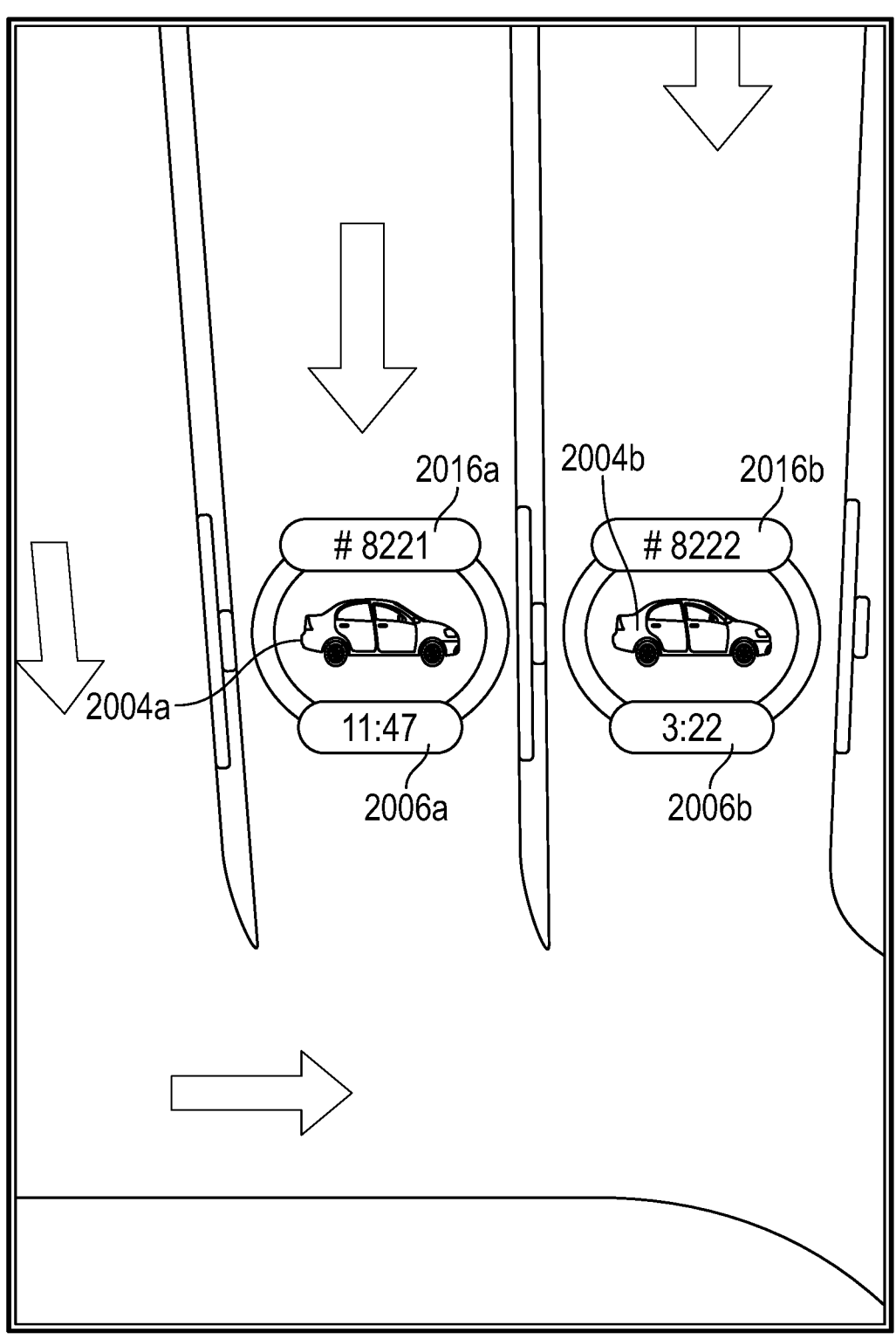
FIG. 22 is a portion of the user interface of FIG. 21 indicating different vehicle icons, according to some embodiments.

Referring to FIG. 22, a portion of the traffic GUI 2002 is shown to include multiple vehicle icons 2004 that correspond to multiple vehicles 30 in the drive through system 10, according to some embodiments. The vehicle icons 2004 each include the total wait time 2006 and also include an associated order number 2016, according to some embodiments. Specifically, a first vehicle icon 2004*a* includes a first order number 2016*a* and a first wait time 2006*a*, while a second vehicle icon 2004*b* includes a second order number 2016*b* and a second wait time 2006*b*. The traffic GUI 2002 as shown and described herein is generated based on the image data from the cameras 114 and can be used by the traffic manager 1040 in order to determine which vehicles 30 to direct to which windows 28.

Figure 23:
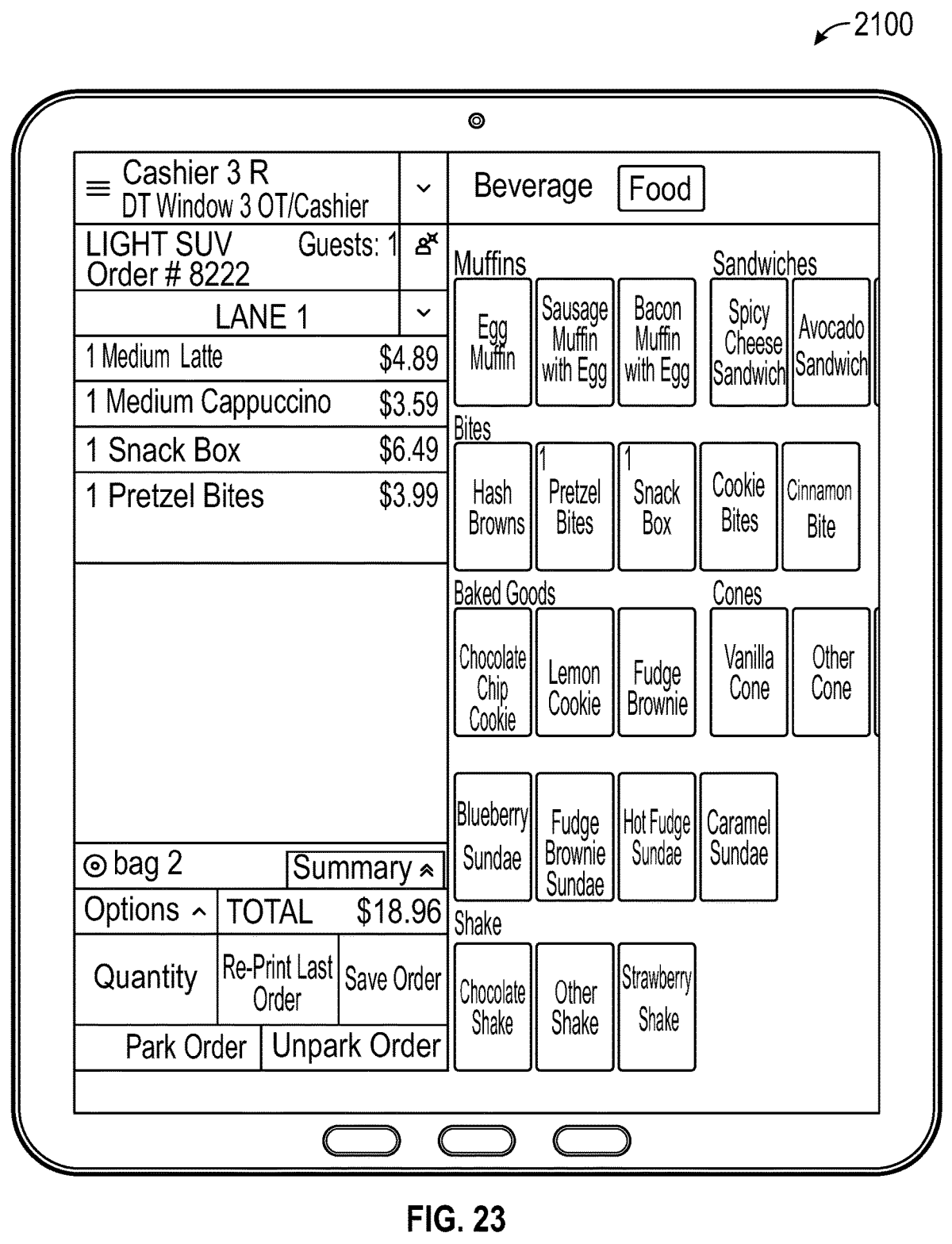

Referring to FIG. 23, an order taker interface 2100 includes menu items, indications of order number for associated vehicles, and point of sale interfacing, according to some embodiments. The order taker interface 2100 is displayed on display screens of the order taking stations 110 or handheld tablets that staff use to take customers orders, according to some embodiments. The order taker interface 2100 is populated based on the results of the vision system 200 and integrates with the communications system 100, according to some embodiments. The communications system 100 can be controlled at the order taker interface 2100 by selecting different channels.

Figure 24:
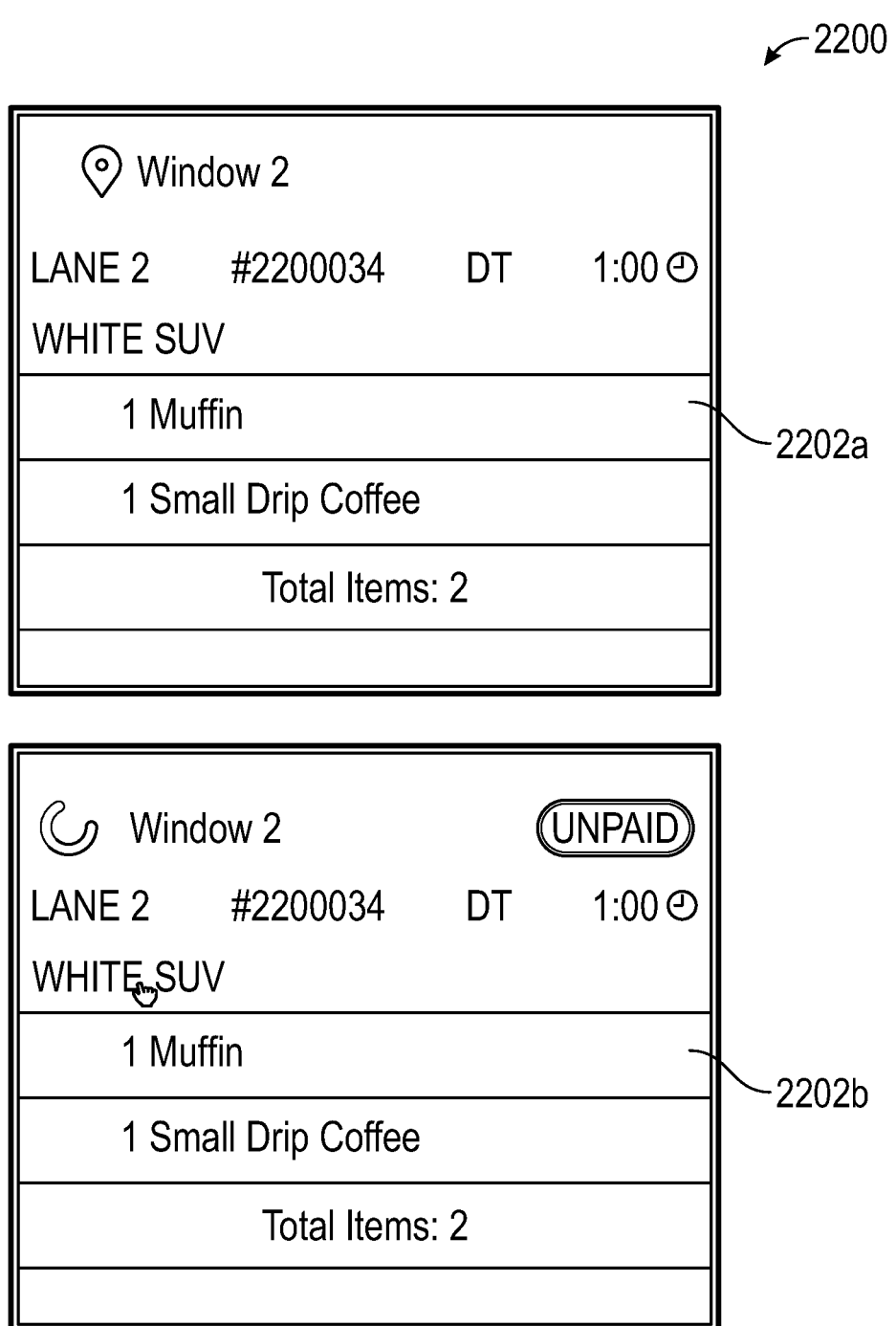
FIG. 24 is a depiction of a user interface that can be presented to order fulfillment staff of the drive through system of FIG. 1, according to some embodiments.

Referring to FIG. 24, an order fulfillment interface 2200 includes an interface 2202 corresponding to an order for a specific vehicle. The interface 2202 includes an indication of where the vehicle is located in relation to a window, according to some embodiments. The interface 2202 also includes order number, which lane the vehicle is present in, and order information, according to some embodiments. The interface 2202 may depict an order and status summary 2202*a* if the customer has already paid for their order. If the customer (e.g., in the white SUV) has not yet paid for their order, the interface 2202 may have an order and status summary 2202*b* and include a visual indication that the order has not yet been paid. The order fulfillment interface 2200 can be provided on the pickup alert device 908 or on a staff-facing display screen at the windows 28.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

In the figures, it should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein can be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor can be a microprocessor, or, any conventional processor, controller, microcontroller, or state machine. A processor also can be implemented as a combination of computing devices, such as a combination of a DSP and a microprocessor, a plurality of microprocessors, one or more microprocessors in conjunction with a DSP core, or any other such configuration.

In some embodiments, particular processes and methods can be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory can be or include volatile memory or non-volatile memory, and may include database components, object code components, script components, or any other type of information structure for supporting the various activities and information structures described in the present disclosure. According to an exemplary embodiment, the memory is communicatively connected to the processor via a processing circuit and includes computer code for execut- ing (e.g., by the processing circuit and/or the processor) the one or more processes described herein. References to "a" or "the" processor should be understood to encompass a plu- rality of processors individually or collectively configured to carry out operations as described herein.

The present disclosure contemplates methods, systems and program products on any machine-readable media for accomplishing various operations. The embodiments of the present disclosure can be implemented using existing com- puter processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-execut- able instructions or data structures and which can be accessed by a general purpose or special purpose computer or other machine with a processor. Combinations of the above are also included within the scope of machine- readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps can be performed concurrently or with partial concurrence, unless specified differently above. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the arrangement of the system as shown in the various exemplary embodiments is illustra- tive only. All such modifications are intended to be included within the scope of the present disclosure. Other substitu- tions, modifications, changes, and omissions can be made in the design and arrangement of the exemplary embodiments without departing from the scope of the present disclosure.

The techniques set forth in the foregoing examples can be utilized in connection with a voice ordering system such as that set forth in U.S. Pat. No. 11,741,529 issued on Aug. 29, 2023. Further, certain embodiments can be used in connec- tion with drive through order processing as set forth in U.S. Pat. No. 11,244,681 issued on Feb. 8, 2022. Additionally, the techniques of the instant disclosure can be used in connec- tion with the techniques set forth in U.S. Provisional Appli- cation Nos. 63/529,850, filed on Jul. 31, 2023, 63/452,218 filed on Mar. 15, 2023, 63/539,920 filed on Sep. 22, 2023, and 63/587,611, filed on Oct. 3, 2023, all of which are expressly incorporated herein by reference in their entireties, including for the systems and methods therein for use in drive-throughs. Further, any publications, patent applica- tions, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

What is claimed is:

1. A system for a drive through, the system comprising:
at least one drive through unit comprising a display screen configured to present display data to a customer in a vehicle;
a plurality of cameras configured to obtain image data of the drive through; and
processing circuitry configured to:
detect, based on image data obtained from the plurality of cameras, a presence of the vehicle at a first of the at least one drive through units;
obtain order data for an order of the vehicle at the first of the at least one drive through units;
responsive to a determination that the order of the vehicle is unprepared or is in preparation, operate the display screen of the first of the at least one drive through units to display a first prompt instructing the vehicle to remain in place; and
responsive to the order of the vehicle being prepared, operate the display screen of the first of the at least one drive through units to display a second prompt instructing the vehicle to proceed to a window, the second prompt further comprising an indication of an identifier of the window.

2. The system of claim 1, wherein the window is one of a plurality of windows of a restaurant, the indication of the identifier of the window comprising a unique textual iden- tifier or a unique graphical identifier, the plurality of win- dows including different textual identifiers or graphical identifiers viewable by a user in a vehicle traveling in a pickup lane along which the plurality of windows are located.

3. The system of claim 1, wherein the window is one of a plurality of windows, the processing circuitry configured to:
determine, based on a characteristic of the vehicle and a detected presence of at least one other vehicle, a particular one of the plurality of windows for order retrieval by the vehicle; and
operate a staff screen to notify order fulfillment staff regarding the particular one of the plurality of windows for order retrieval;
wherein operating the display screen of the first of the at least one drive through units to display the second prompt comprises operating the display screen of the first of the at least one drive through units to notify a customer in the vehicle regarding the particular one of the plurality of windows for order retrieval, and prompting the customer in the vehicle to drive to the particular one of the plurality of windows;
wherein the processing circuitry is configured to deter- mine the particular one of the plurality of windows for order retrieval based on one or more of (i) a size of the vehicle, (ii) an identification of which of the plurality of windows are available or (iii) a preferred one of the plurality of windows based on the size of the vehicle.

4. The system of claim 1, wherein the processing circuitry is configured to:

in response to receiving an input from a customer in the vehicle, operate the display screen of the first of the at least one drive through units to instruct the customer to drive the vehicle to a particular parking spot for a remedial order procedure, wherein operating the display screen further comprising identifying the particular parking spot for parking the vehicle.

5. The system of claim 3, wherein the characteristic comprises a type of payment method of the customer in the vehicle, wherein the processing circuitry is configured to determine the particular one of the plurality of windows for order retrieval based on the type of payment method of the customer in the vehicle, or based on which of the plurality of windows are provided with equipment configured to process the type of payment method of the customer.

6. The system of claim 1, wherein the window is one of a plurality of windows, the processing circuitry configured to:

determine, based on a detected presence of at least one other vehicle and a default window of the plurality of windows, a particular one of the plurality of windows for order retrieval, wherein the particular one of the plurality of windows is the default window when no vehicle is present at the default window; and operate a staff screen to notify order fulfillment staff regarding the particular one of the plurality of windows for order retrieval;

wherein operating the display screen of the first of the at least one drive through units to display the second prompt comprises operating the display screen of the first of the at least one drive through units to notify a customer in the vehicle regarding the particular one of the plurality of windows for order retrieval, and prompting the customer in the vehicle to drive to the particular one of the plurality of windows.

7. The system of claim 1, wherein the first of the at least one drive through units is positioned in one of a plurality of lanes, each of the plurality of lanes including a corresponding drive through unit, wherein the processing circuitry is configured to:

determine, based on image data of the plurality of lanes and an entrance to the plurality of lanes, a stack size of each of the plurality of lanes, the stack size being a total number of vehicles currently in each of the plurality of lanes;

select one of the plurality of lanes based on the stack size of each of the plurality of lanes; and operate a field display screen to instruct a driver of an incoming vehicle to drive to the selected one of the plurality of lanes, the field display screen positioned at the entrance to the plurality of lanes.

8. A method of operating a drive through interface of a drive through system, the method comprising:

detecting a presence of a vehicle at the drive through system based on image data of a portion of a lane at the drive through system obtained from at least one camera of the drive through system;

responsive to an order being placed by a customer in the vehicle via the drive through interface, operating a display screen of the drive through interface to notify the customer as to a status of the order;

when the order is not yet available for pickup, operating the display screen of the drive through interface to prompt the customer to keep the vehicle in place until both (i) the customer has paid at the drive through interface, and (ii) the order is available for pickup at a particular pickup window of a plurality of pickup windows; and responsive to the order being available for pickup at the particular pickup window of the plurality of pickup windows, operating the display screen of the drive through interface to notify the customer that the order is available for pickup and prompting the customer to drive the vehicle to the particular pickup window.

9. The method of claim 8, further comprising:

determining, based on image data indicating the presence of the vehicle, and a characteristic of the vehicle, a particular one of the plurality of windows for order retrieval; and responsive to the order being prepared, operating a staff screen to notify order fulfillment staff regarding the particular one of the plurality of pickup windows for order retrieval.

10. The method of claim 9, wherein the characteristic of the vehicle comprises a size of the vehicle, wherein the method includes determining the particular one of the plurality of pickup windows based on a preferred pickup window for vehicles of the size of the vehicle.

11. The method of claim 9, wherein the characteristic of the vehicle comprises a payment method of the customer in the vehicle, wherein the method includes determining the particular one of the plurality of pickup windows based on the payment method or which of the plurality of pickup windows are provided with equipment configured to process the payment method of the customer.

12. A non-transitory computer readable medium configured to store instructions that, when executed by at least one processor, cause the at least one processor to perform operations comprising:

detecting a presence of a vehicle at a drive through unit based on image data of a portion of a lane at a drive through obtained from at least one camera of the drive through;

responsive to an order being placed by a customer in the vehicle via the drive through unit of the drive through, operating a display screen of the drive through unit to notify the customer that the order is not ready and instruct the customer to keep the vehicle in place;

determining a designated pickup window of a plurality of pickup windows based on a type of payment method of the customer in the vehicle, and based on which of the plurality of pickup windows are provided with equipment to process the type of payment method of the customer; and responsive to the order being ready for pickup at the designated pickup window of a plurality of pickup windows, operating the display screen of the drive through unit interface to notify the customer of the order being ready and to instruct the customer to drive the vehicle to the designated pickup window.

13. The non-transitory computer readable medium of claim 12, wherein the operations further comprise:

determining the designated pickup window of the plurality of pickup windows for order retrieval based on at least one of (i) a characteristic associated with the vehicle or a customer in the vehicle, and (ii) a detected presence of at least one other vehicle; and operating a second display screen to notify order fulfillment staff of the designated pickup window.

14. The non-transitory computer readable medium of claim 13, wherein operating the display screen of the drive through unit further comprises notifying a customer in the vehicle of the designated pickup window of a change in order status.

15. The non-transitory computer readable medium of claim 13, wherein the operations comprise determining the designated pickup window for order retrieval based on one or more of (i) a size of the vehicle, (ii) an identification of which of the plurality of pickup windows are available, and (iii) a preferred one of the plurality of pickup windows based on the size of the vehicle.

16. The non-transitory computer readable medium of claim 12, wherein the operations further comprise:

in response to receiving an input from a customer in the vehicle, operating the display screen of the drive through unit to instruct the customer to drive the vehicle to a particular parking spot for a remedial order procedure, wherein operating the display screen further comprising identifying the particular parking spot for parking the vehicle.

17. The non-transitory computer readable medium of claim 12, wherein the operations further comprise:

determining, based on a detected presence of at least one other vehicle and a default window of the plurality of windows, the designated pickup window among the plurality of windows for order retrieval by the vehicle, wherein the designated pickup window is the default window when no vehicle is present at the default window.

18. The non-transitory computer readable medium of claim 12, wherein the operations further comprise:

determining, based on image data of a plurality of lanes and an entrance to the plurality of lanes, a stack size of each of the plurality of lanes, the stack size being a total number of vehicles in each of the plurality of lanes;

selecting one of the plurality of lanes based on the stack size of each of the plurality of lanes; and operating an entrance display screen to notify a driver of an incoming vehicle to drive to the selected one of the plurality of lanes, the entrance display screen positioned at the entrance to the plurality of lanes.

* * * * *